United States Patent [19]
Galvanauskas et al.

[11] Patent Number: 5,847,863
[45] Date of Patent: Dec. 8, 1998

[54] HYBRID SHORT-PULSE AMPLIFIERS WITH PHASE-MISMATCH COMPENSATED PULSE STRETCHERS AND COMPRESSORS

[75] Inventors: Almantas Galvanauskas; Anand Hariharan; Donald J. Harter, all of Ann Arbor, Mich.

[73] Assignee: IMRA America, Inc., Ann Arbor, Mich.

[21] Appl. No.: 637,956

[22] Filed: Apr. 25, 1996

[51] Int. Cl.$^6$ .................................................. H01S 3/00
[52] U.S. Cl. .......................... 359/341; 359/333; 359/337
[58] Field of Search ................................. 359/333, 337, 359/341, 345

[56] References Cited

U.S. PATENT DOCUMENTS 5,384,798   1/1995   Zucker et al. .
5,499,134   3/1996   Galvanauskas et al. .
5,638,204   6/1997   Grasso et al. ........................... 359/341

OTHER PUBLICATIONS

D. Strickland and G. Mourou, Opt. Commun. 56, 219, (Dec. 1985).
E.E. Treacy, IEEE J. Quant. Electr. QE–5, 454 (Sep. 1969).
O.E. Martinez, IEEE J. Quant. Electr. QE–23, 59 (Jan. 1987).
B.E. Lermoff and C.P. Barty, Opt. Lett. 18, 1651 (Apr. 1993).
P. Maine, D. Strickland, P. Bado, M. Pessot, and G. Mourou, IEEE J. Quant. Electron QE–24,398 (Feb. 1988).
S. Kane and J. Squier, EEE J. Quant. electron. QE–31, 2052 (Nov. 1995).
W.E. White, F. G. Patterson, R.L. Combs, D.F. Price, and R.L. Shepherd, Opt., Lett. 18, 1343 (Aug. 1993).
A. Galvanauskas, M.E. Fermann, P. Blixt, J.T. Tellefsen, D. Harter, Opt. Lett. 19, 1043 (Jul. 1994).
A. Hariharan, M.E. Fermann, M.L. Stock, D. Harter, and J. Squier, Opt. Lett. 21, 128 (Jan. 1996).
P.J.Delfyett, S.Grantham, K.Gabel, AYusim, S.Gee, M.Richardson, G.Alphonse, J.Connolly, in Conference on Lasers & Electro–Optics, 1995 Technical Digest Series, vol. 15, (1995) paper CThM6.
A.Galvanauskas, M.E.Fermann, D.Harter, K.Sugden and I.Bennion, Appl., Phys. Lett. 66, 1053 (Feb. 1995).
M.E.Fermann, A.Galvanauskas, D.Harter, Appl., Phys. Lett. 64, 1315 (Mar. 1994).
M.M.Fejer, G.A.Magel, D.H.Jundt, and R.L.Byer, IEEE J. Quant. electron. QE–28, 2631 (Nov. 1992).
Technical manual from Energy Compression Research Corp.
J.K.Rhee, T.S.Sosnowski, T.B.Norris, J.A.Arns, W.S.Colburn, Opt. Lett. 19, 1550 (Apr. 1994).

(List continued on next page.)

*Primary Examiner*—Mark Hellner
*Attorney, Agent, or Firm*—Sughrue, Mion, Zinn, Macpeak & Seas, PLLC

[57] ABSTRACT

Disclosed is a system for amplification of ultrashort optical pulses. The disclosed system has reduced size and increased robustness, reliability and cost-effectiveness. The disclosed invention is particularly effective in chirped pulse amplification (CPA) systems wherein pulses are stretched, amplified, and re-compressed. According to one aspect of the invention a compact stretcher is used with a bulk compressor, and compatibility between them is achieved by inserting a telescope in the path of the collimated beam. Alternatively, compatibility between the stretcher and the compressor is achieved by creating nonlinearly chirped bragg grating in the fiber stretcher. According to another aspect of the invention, a fiber and a bulk amplifiers are used to amplify the pulse, and compatibility between them is achieved by inserting a doubling crystal in the path of the pulse between the two amplifiers. Another aspect of the disclosed amplification system is the pumping of a laser amplifier with a laser pump of the same material as the laser amplifier, but operating under different conditions.

43 Claims, 27 Drawing Sheets

OTHER PUBLICATIONS

L.E.Myers, R.C.Eckardt, M.M.Fejer, R.L..Byer, W.R.Bosenberg, J.W.Pierce J. Opt. Soc. Am. B. 12, 2102 (Nov. 1995).

W.H. Glenn, IEEE J. Quant. Electron QE–5, 284 (Jun. 1969).

M.L. Shand, J.C. Walling and H. Jenssen, IEEE J. Quant. Electron QE–18, 167 (Feb. 1982).

H.Po, J.D.Cao, B.M. Laliberte, R.A. Minns, R.F. Robinson, B.H. Rockney, R.R. Tricca and and Y.H. Zhang, Electron Lett 29, 1500 (Jun. 1993).

H.Nakamura, AFujisaka, H.Ogoshi, in Optical Fiber Communication, Technical Digest, Paper WK9, (Feb.–Mar. 1996) San Jose, Cal.

M. Born and E.Wolf, Principles of Optics, Pergamon Press, Oxford, 1975, chps. 5 and 9.

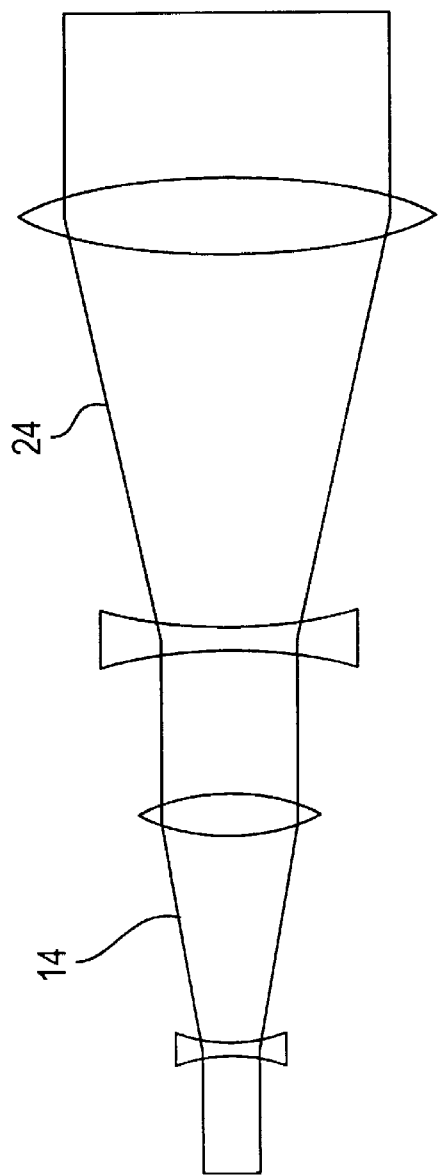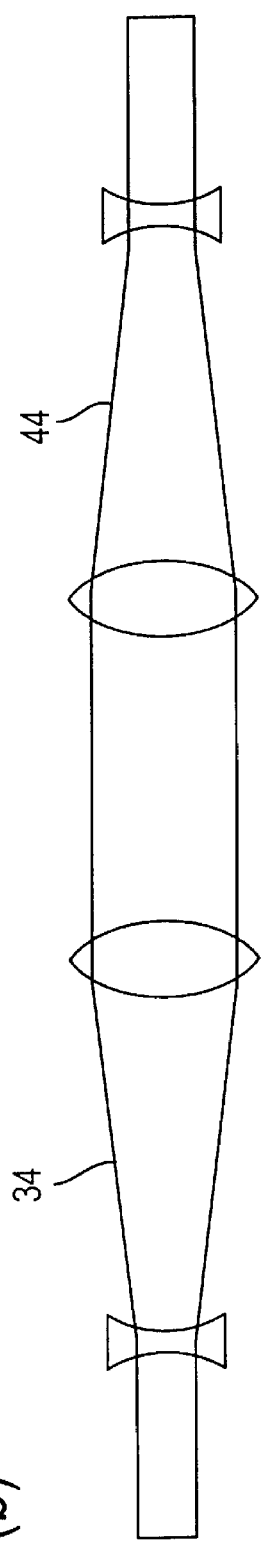
FIG. 4(a)
FIG. 4(b)

HYBRID SHORT-PULSE AMPLIFIERS WITH PHASE-MISMATCH COMPENSATED PULSE STRETCHERS AND COMPRESSORS

BACKGROUND OF THE INVENTION

1. Field of the Invention

The present invention relates to laser technology. More particularly, the present invention relates to amplification of ultrashort optical pulses. It is aimed to reduce the size and to increase the robustness, reliability and cost-effectiveness of such amplification systems.

2. Description of Related Art

Due to the limitations on pulse peak power in optical components of an amplifier, ultrashort pulse amplification is typically accomplished using to chirped pulse amplification (CPA) (D. Strickland and G. Mourou, "Compression of Amplified Chirped Optical Pulses," Opt. Commun. 56, 219 (1985)). In this method, initial ultrashort pulses are stretched to a sufficient duration (typically 0.1–1 ns), preventing intolerable peak powers inside an amplifier, then amplified and recompressed back to restore the initial short duration.

At present, CPA is a universal technique employed in a variety of laser systems with different output pulse energies, durations and wavelengths. Apart from the quest for higher energies and shorter durations, extensive efforts have been directed towards developing commercial systems. General requirements for any laser system to be commercially successful are compactness, robustness, reliability and cost-effectiveness. However, the main drawback of the present high-energy CPA systems is their considerable complexity and size. Currently they are expensive and large systems, requiring highly skilled personnel and costly maintenance.

A typical CPA system consists of a pulse source, pulse stretching and recompression arrangements, and an optical amplifier. For high-energy systems (microjoule to joule output pulse energies) a pulse stretcher have to provide large group-velocity dispersion (GVD) to achieve stretching ratios of $10_3$–$10_5$. A pulse compressor should have a matching compression ratio and, additionally, should not be susceptible to damage and should not cause pulse distortions at high peak powers of recompressed pulses. At present all the above requirements for a high-energy system can be met only by using diffraction gratings both in stretchers and compressors.

Negative GVD is conventionally obtained with a parallel diffraction grating pair (generally known as a Treacy configuration) (see, E. B. Treacy, "Optical Pulse Compression With Diffraction Gratings," IEEE J. Quant. Electr. QE-5, 454 (1969)). Positive GVD is conventionally obtained with antiparallel gratings and a telescope between them (Martinez configuration) (see, O. E. Martinez, "3000 Times Grating Compressor with Positive Group Velocity Dispersion: Application to Fiber Compression in 1.3–1.6 $\mu$m Region," IEEE J. Quant. Electr. QE-23, 59 (1987)). At high energies Treacy configuration is preferable for pulse compression, because the absence of any additional material between the gratings makes it less susceptible to optical damage and nonlinear effects. A perfect matching between the stretcher and compressor GVD requires identical gratings to be set at identical incidence angles, identical distances between gratings and the telescope to be free from aberrations. In practice, such perfect matching is difficult to achieve due to the additional GVD of the optical amplifier components, aberrations of the telescope and very tight alignment tolerances for femtosecond pulses (e.g., B. E. Lermoff and C. P. J. Barty, "Quintic-phase-limited, spatially uniform expansion and recompression of ultrashort optical pulses," Opt. Lett. 18, 1651 (1993)).

The major problem of using diffraction gratings is that such arrangements are very large. To obtain pulse expansion to about 1 ns typically requires 1–2 m grating separation. Such distances become particularly unacceptable in compact fiber-based CPA systems.

Attempts have been made to partly overcome this problem by using compact stretchers (e.g., fiber) as a replacement for a diffraction grating pair. This would allow to reduce the overall size of stretching/compression arrangement considerably. The original work on CPA used a standard optical fiber to stretch initial pulses and diffraction gratings for pulse recompression. Fiber can not be used for pulse compression due to very low nonlinear-effect threshold. The problem here is that both an optical fiber and a diffraction grating pair based devices exhibit not only linear but also higher order GVD terms which are very different for each of the devices, making it impossible to perfectly match their GVD. E.g., at large stretching ratio this gives a large third-order GVD mismatch responsible for recompressed pulse durations longer than about 1 ps (P. Maine, D. Strickland, P. Bado, M. Pessot, and G. Mourou, "Generation of Ultrahigh Peak Power Pulses by Chirped Pulse Amplification," IEEE J. Quant. Electron. QE-24, 398 (1988)).

Recently a solution was proposed to obtain a perfect third-order matching for 100 fs pulses between a fiber stretcher and a diffraction-grating compressor written directly on the prism surface ("prism" ) (S. Kane and J. Squier, "Grating Compensation of Third-Order Material Dispersion in the Normal Dispersion Regime: Sub-100-fs Chirped-Pulse Amplification Using a Fiber Stretcher and Grating-Pair Compressor," IEEE J. Quant. Electron. QE-31, 2052 (1995)). This solution, however, suffers from serious limitations. First, it does not compensate for fourth and higher order GVD, which is important for larger stretching ratios and for pulses shorter than 100 fs. Second, it was demonstrated only for about 800 nm wavelength range where the linear GVD is large and linear/nonlinear GVD ratio in a fiber is close in magnitude to that of a grating pair. For example at 1550 nm this concept is very difficult to implement due to a much larger difference in third order GVD. Consequently, this scheme is very rigid and gives a limited amount of nonlinear GVD. It can not be used to compensate for arbitrary amounts of nonlinear GVD mismatch.

A solution to obtaining adjustable third and fourth order dispersion control has been proposed in W. E. White, F. G. Patterson, R. L. Combs, D. F. Price, and R. L. Shepherd, "Compensation of higher-order frequency-dependent phase terms in chirped-pulse amplification systems," Opt. Lett. 18, 1343 (1993), where aberrations of a lens doublet were exploited in a Martinez stretcher. This third and fourth order control was suggested to use to achieve very fine tuning of the phase of recompressed pulses in order to increase pulse fidelity from a standard diffraction-grating stretcher and compressor configuration. Achromatic doublet was implemented as [a] lenses in a folded Martinez telescope arrangement for collimating the diffracted diverging beam from a grating in the diffraction plane and simultaneously focussing the same beam onto a folding mirror in the plane perpendicular to the diffraction. Such design allows to control nonlinear GVD by moving the negative and positive curvature lenses of the doublet with respect to each other.

However, the magnitude of the nonlinear GVD achievable with this method is inherently very small. An achromatic doublet gives only a small amount of aberrations. Due to the requirement of maintaining simultaneous collimation and focussing in perpendicular planes the lenses can not be moved more than by a fraction of a millimeter. This gives the adjustable amount of the third and fourth order GVD achievable with this scheme of only $\sim 10^{-40}$ s$^3$ and $\sim 10^{-52}$ s$^4$ respectively. It is orders of magnitude less than the $\sim 10_{-35}$ s$^3$ and $\sim 10^{-49}$ s$^4$ required in third and fourth order control, respectively, for GVD matching between $\sim 1$ km of fiber and a diffraction grating pair. At present there is no known method for compensating such a large GVD mismatch between a different stretcher and a compressor.

With respect to their size and the type of gain, medium amplification arrangements for CPA can be divided into two main groups. These are fiber (A. Galvanauskas, M. E. Fermann, P. Blixt, J. A. Tellefsen, D. Harter, "Hybrid diode-laser fiber-amplifier source of high-energy ultrashort pulses," Opt. Lett. 19, 1043 (1994)) and bulk solid-state based amplifiers (P. Maine, D. Strickland, P. Bado, M. Pessot, and G. Mourou, "Generation of Ultrahigh Peak Power Pulses by Chirped Pulse Amplification," IEEE J. Quant. Electron. QE-24, 398 (1988)). Fiber amplifiers are much more compact and robust compared to solid-state. However, their maximum pulse energies are limited by the small cross-section area of the amplifying medium (typical single-mode fiber core is only 5–10 μm in diameter). Fiber systems can deliver up to 10–100 μJ of pulse energy, which is much less than $\sim 1$ J attainable with a solid-state system.

Attempts have been made to compromise the size of a CPA system by combining compact sources with solid-state amplifiers. Semiconductor diode and frequency-doubled fiber lasers have been used to generate ultrashort pulses for injection into a solid-state CPA system (A. Hariharan, M. E. Fermann, M. L. Stock, D. Harter, and J. Squier, "Alexandrite-pumped alexandrite regenerative amplifier for femtosecond pulse amplification," Opt. Lett. 21, 128 (1996); P. J. Delfyett, S. Grantham, K. Gabel, A. Yusim, S. Gee, M. Richardson, G. Alphonse, J. Connolly, "Ultrafast semiconductor-laser-diode-seeded CR:LiSAF regenerative amplifier system," in Conference on Lasers to and Electro-Optics, 1995 Technical Digest Series, Vol. 15 (Optical Society of America, Washington, D.C., 1995), paper CThM6). The main drawbacks of these schemes are the low injected pulse energies, resulting in high amplified spontaneous emission (ASE) background from the amplifier and strong gain narrowing effect, as well as the inability to further reduce the system size by using compact semiconductor or fiber amplifiers at the first CPA amplification stages. The latter comes from the fact that semiconductor amplifiers can not provide any substantial pulse energies (<100 pJ), and fiber amplifiers are operating at long wavelengths (1.55 μm), far away from the typical wavelengths (around 800 nm) of solid-state amplifiers.

SUMMARY OF THE INVENTION

It is an object of the present invention to provide hybrid designs for chirped pulse amplification systems of both stretcher/compressor and an optical amplifier for generating high energy ultrashort optical pulses, such that compact components are used in an optical path where the optical intensities are low and bulk components are used at the final stages of a system, where optical peak intensities become intolerably high for compact components. Such hybrid designs substantially reduce the size and cost of the system, and increase its robustness and reliability and improved performance characteristics, such as output pulse duration, bandwidth, energy and contrast ratio.

The present invention has two major aspects. The first aspect is the means for compensating very large GVD mismatch between different type stretchers and compressors. Such compensation allows to combine compact stretching arrangements with bulk compression arrangements thereby dramatically reducing the overall size of the system. Bulk components are necessary at the output of the system at high pulse energies. According to certain embodiments of the present invention, optical aberration of a lens arrangement or nonlinearly chirped Bragg gratings are employed for this compensation. The second aspect is the means to combine different types of gain media in a single amplifier arrangement, such that no pulse stretching or compression is required inside the amplifier. An important solution provided by the present invention is the efficient frequency conversion of long stretched optical pulses between different types of amplifier cascades. This allows to substantially reduce the amplifier part.

According to the present invention any particular CPA system can include either only one of the two parts or can combine both parts of the invention together. Schematically this is shown in FIGS. 1(a) and 1(b). FIG. 1(a) shows the first aspect of this invention constituted of a compact stretcher 20 and bulk compressor 40 used with any conventional non-hybrid CPA system. Specifically, as shown in FIG. 1(a), the exemplary system comprises an oscillator 10 generating a pulse P and sending the appropriate timing signalling to the triggering electronics 50. The pulse P is stretched in the compact stretcher 20 and is applied to the optical amplifier 30, together with a signal from the triggering electronics 50. The amplified pulse AP is then compressed by the bulk compressor 40 to produce the amplified compressed pulse CP.

In FIG. 1(b), a hybrid CPA injection scheme is shown which generally comprises a compact injection source 1 and a high-energy bulk amplifier 2. A compact (fiber) oscillator 5 produces the signal pulses which are initially stretched by the stretcher 15 and amplified in a compact (fiber) amplifier 25. The initially amplified signal is applied to the optical frequency converter 45 to be frequency doubled to obtain a typical wavelength for a solid state amplifier. Then the signal is injected into a high-energy (solid-state) amplifier 55 and is finally recompressed with a bulk compressor 65: In a conventional system, the triggering electronics 35 would be used in a manner similar to that shown in FIG. 1(a), except that the output of the signal would also be applied to the compact amplifier 25 and to the high-energy amplifier 55. However, as will demonstrated later on, according to the present invention, the system is made much more compact and robust by eliminating the need for the triggering electronics to operate the switching of the high-energy amplifier 55.

This latter arrangement can use either conventional stretcher/compressor design based only on diffraction gratings or a hybrid scheme suggested in the first aspect of the present invention. As noted above, both systems in FIGS. 1(a) and 1(b) additionally contain electronic means to synchronize timing between the optical gates in the amplification stages and the oscillator, and to select the required pulse repetition rate for each of the stages.

Features and advantages of the both aspects of the present invention will be more fully revealed in the description of the exemplary preferred embodiments which follow below.

BRIEF DESCRIPTION OF THE DRAWINGS

FIGS. 2(a), (b) and (c) depict the arrangements of conventional Treacy, Martinez, and folded Martinez type systems, respectively, while

FIGS. 4(a) and 4(b) depict exemplary cascading telescopes arrangements according to the present invention.

FIG. 10(a) depicts an exemplary arrangement of a hybrid fiber stretcher and Alexandrite CPA system having a doubling crystal according to an aspect of the present invention, while

FIG. 11(a) depicts the second harmonic spectrum obtained with compressed femtosecond pulses, while

DETAILED DESCRIPTION OF THE PREFERRED EMBODIMENTS

1. Arrangements for Compensating GVD Mismatch.

The capability to compensate for large GVD mismatches between a stretcher and a compressor allows to combine very different arrangements and consequently to reduce size and increase robustness of the overall system by using compact arrangements for stretching.

For further explanation, it is useful to express mathematically the requirement for the perfect matching between the stretcher and the compressor. A pulse is completely characterized by its amplitude and phase either in temporal or spectral domains. Pulse spectral phase can be expanded about pulse spectrum central frequency $\omega_0$:

$$\phi(\omega)=\beta_0+\beta_1(\omega-\omega_0)+\beta_2(\omega-\omega_0)^2+\beta_3(\omega-\omega_0)^3+\ldots$$

Here $\omega=2\pi\nu$ is the cyclic frequency. A pulse has its minimum, bandwidth limited duration if all the terms except the zero and the first order in this expansion are zero. First, second, third and higher order terms are called first, second, third and etc. order phase. Pulse reshaping action of the stretcher or compressor is determined by the terms starting from the second order and higher. The coefficients $\beta_2$, $\beta_3$, etc., in the expansion of non-bandwidth limited pulses give the sign and magnitude of the first, second and etc. order dispersions respectively. These coefficients give GVD characteristics of a stretcher or a compressor. Perfectly matched stretcher and compressor require dispersion coefficients at each order to be equal in magnitude and opposite in sign. As it is described in the Background of the Invention section of the present disclosure, so far this matching has been obtained by building stretchers and compressors of the same type (e.g., diffraction grating based).

According to one aspect of the present invention, GVD matching problem is solved by using an aberration telescope. However, while throughout the description herein reference is made to a telescope, the particular features of the invention can be achieved by any lens arrangement which preserves the collimation of the beam, while expanding, reducing or preserving its size.

Figure 2A:
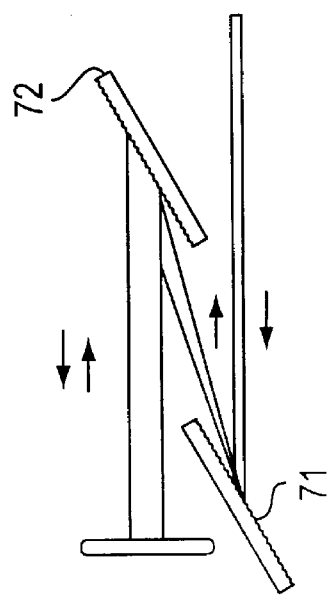
Figure 2B:
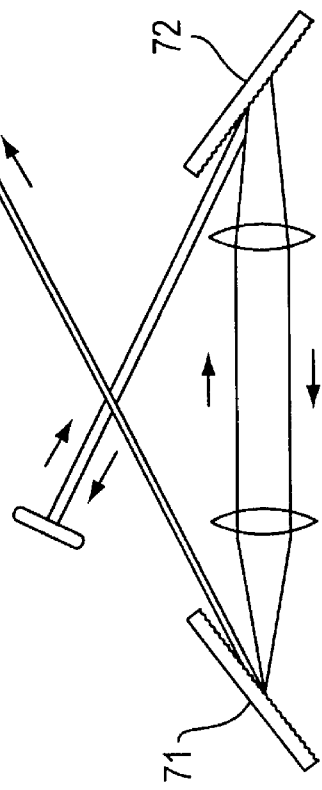
Figure 2C:
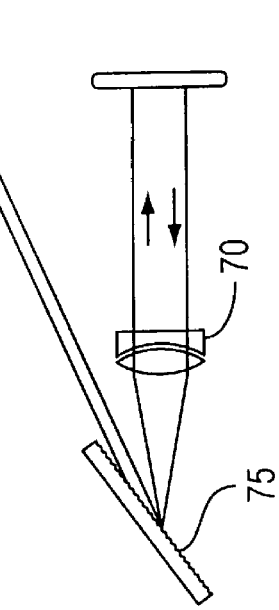

Conventional Treacy and Martinez configurations are shown in FIGS. 2(a) and (b), respectively, having a first grating 71 which diverges the beam and a second grating 72 which collimates the beam. They contain no means for aberration control of higher order GVD terms. A folded Martinez-type configuration proposed in W. E. White, F. G. Patterson, R. L. Combs, D. F. Price, and R. L. Shepherd, "Compensation of higher-order frequency-dependent phase terms in chirped-pulse amplification systems," Opt. Lett. 18, 1343 (1993) (White et al.) and using a doublet 70 in a Martinez telescope to control aberration is shown in FIG. 2(c). In this arrangement the beam is diverging in the plane of diffraction. As noted earlier this arrangement gives very limited range of control insufficient for hybrid stretcher/compressor design.

Figure 2D:
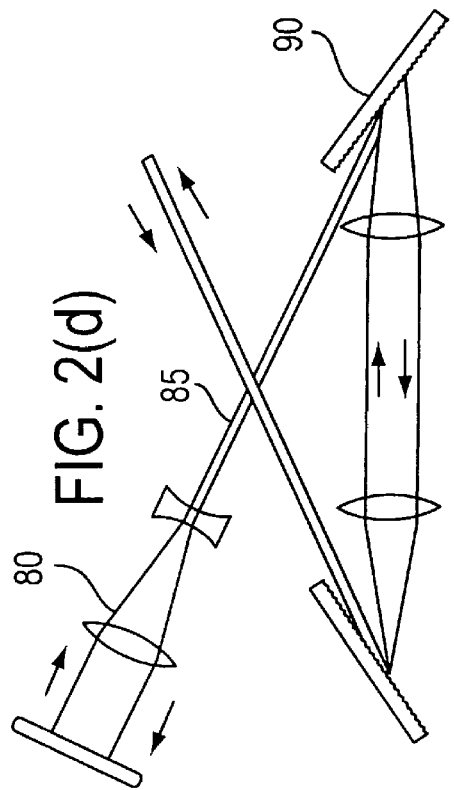
FIG. 2(d) depicts the arrangement of an exemplary embodiment of an aspect of the present invention.

Instead of exploiting aberration of an achromatic doublet 70 placed in a diverging beam from a diffraction grating 75, according to the present invention a telescope 80 is introduced into the path of collimated beam 85 emanating from the collimating grating 90 as shown in FIG. 2(d). In the Martinez type compressors shown in FIGS. 2(b) and 2(c), telescope 80 would be introduced in addition to the already existing telescope which receives the diverging beam. The collimated beam, which is always present in both Martinez and Treacy type configurations, is spatially chirped in the plane of diffraction. As is shown below, such configuration allows to overcome limitations present in the system proposed by White et al., and to obtain many orders of magnitude larger phase correction, sufficient for compensating large GVD mismatches between different types of stretchers and compressors. One reason is that telescope 80 can be designed to give much larger aberrations than an achromatic doublet 70. Because this additional aberration-telescope 80 is separated from the rest of the diffraction grating arrangement, it can be designed to give a large amount of third and fourth order phase without essentially affecting other parameters of the system. An additional feature is that in this configuration telescopes can be cascaded or other multi-lens designs can be used to increase the amount of the phase control to the required level, because the collimated rather than focussed beams are used. Finally, in contrast to the system suggested in White et al., this aberration-control method can be used in any type of dispersive delay line with a collimated spatially chirped beam, e.g., in a prism compressor (see example below).

Figure 3A:
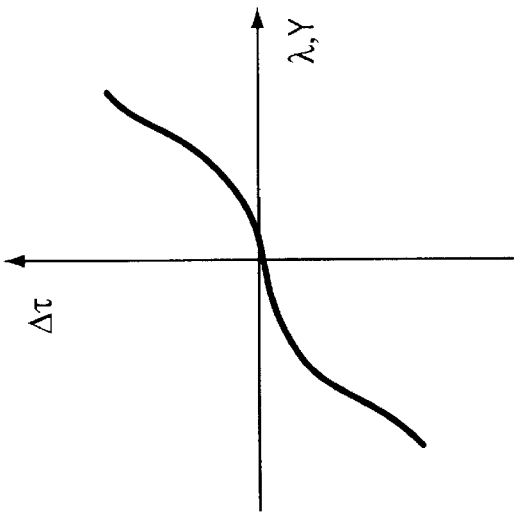
FIGS. 3(a) and 3(b) are curves demonstrating the wave-front deformation $\Delta\Phi$ of a wave passing through the lens arrangement (telescope) shown in FIG. 3.
Figure 3B:
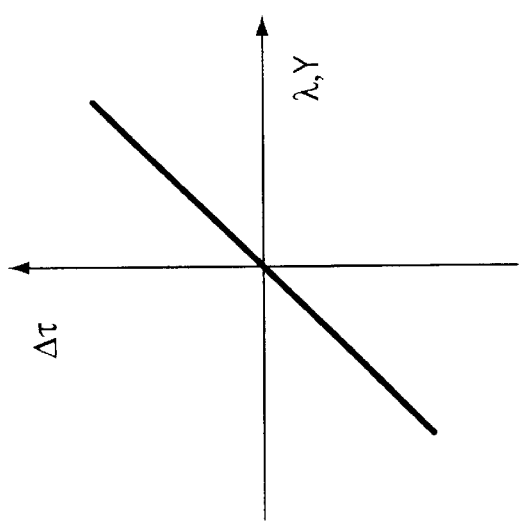
Figure 3C:
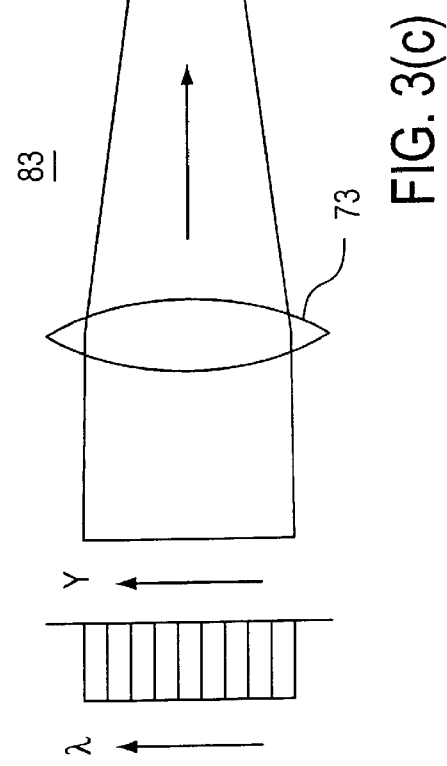
FIG. 3 depicts the principle of controlling the phase of ultra-short pulses according to an aspect of the present invention.

The principle of controlling the phase of ultrashort pulses by using an aberration telescope according to an aspect of the present invention is shown in FIG. 3. A collimated optical beam passes a telescope arrangement 83, such that the output beam is also collimated. Due to the spherical shape of the surfaces of lenses 73 and 93, the passing beam in the telescope 83 experiences a wave-front deformation $\Delta\Phi$, as demonstrated in FIGS. 3a and 3b. $\Delta\Phi$ is the optical path length difference between aberration-distorted and ideal undistorted wavefronts (equivalently, phase difference added by aberrations). Under Seidel approximation (M. Born and E. Wolf, *Principles of Optics*, Pergamon Press, Oxford, 1975, chps. 5 and 9), this deformation can be expressed as a superposition of deformations due to the five primary aberrations, each listed in Table I. Because the incoming beam is collimated in both dimensions perpendicular to propagation, consideration of a two dimensional case is sufficient. In Table I, $\rho$ is the ray distance from the center of the beam measured in the plane of the spatial chirp. More complete description of Seidel aberrations can be found in e.g., M. Born and E. Wolf, *Principles of Optics*, Pergamon Press, Oxford, 1975, chps. 5 and 9.

When such a telescope is placed in a spatially chirped and collimated beam, this wavefront deformation will be transformed into a spectral phase deformation. This can be accomplished e.g., by placing a telescope in a collimated spatially chirped beam inside a diffraction-grating compressor, where $(\omega-\omega_0) \propto \rho$. Note again that in a diffraction grating arrangement, the beam is spatially chirped only in one dimension (in the plane of diffraction). After compression with such a compressor, pulse spectral phase will acquire additional phase components corresponding to each of the five primary aberrations (see Table I.).

TABLE I

Correspondence between wavefront and spectral phase distortions by primary Seidel aberrations.

| Primary Aberration | Wavefront Distortion | Corresponding Spectral Phase |
|---|---|---|
| Spherical | $\Delta\Phi \propto \rho^4$ | $\Delta\phi \propto (\omega-\omega_0)^4$ |
| Coma | $\Delta\Phi \propto \rho^3$ | $\Delta\phi \propto (\omega-\omega_0)^3$ |
| Astigmatism | $\Delta\Phi \propto \rho^2$ | $\Delta\phi \propto (\omega-\omega_0)^2$ |
| Curvature of field | $\Delta\Phi \propto \rho^2$ | $\Delta\phi \propto (\omega-\omega_0)^2$ |
| Distortion | $\Delta\Phi \propto \rho^1$ | $\Delta\phi \propto (\omega-\omega_0)^1$ |

The table shows that for this case spherical aberration gives rise to additional quartic phase, coma gives rise to cubic phase and astigmatism with curvature of field give rise to quadratic phase terms. Distortion is the first order effect and it only contributes to additional temporal delay of the pulse but not to pulse broadening. From the practical point of view, aberration control of only quartic and cubic phases is important, because quadratic phase of recompressed pulses can be easily adjusted by changing the length of the compressor (or stretcher).

Note that if a spatially chirped beam is nonlinearly chirped, then higher order terms will also appear. E.g., by making spatial chirp quadratic the phase correction terms corresponding to each of the primary aberrations would increase their order by one. Then the highest phase correction order available would be quintic. In diffraction grating arrangements the nonlinear spatial chirp is much smaller than the linear and its effect can be neglected. Therefore, in practice it is easiest to obtain phase control up to the quartic term. For obtaining transform limited pulses this is sufficient in most of the cases.

The telescope used by the systems of the present invention can be of any type, but the one consisting of positive and negative lenses (concave and convex), which give opposite-sign wavefront distortions, is preferable. One example is a Galilean telescope as shown in FIG. 3. For the telescope with concave and convex lenses the resultant aberration can be designed to give either positive or negative $\Delta\phi$. The amount of the phase distortion by each lens is increasing with the beam size (or with lower f-numbers for the marginal-rays). Coma, which gives cubic phase correction, is present only if the beam is entering at an angle (off-axis propagation). By rotating the telescope with respect to the incoming collimated beam (in the same plane as the spatial chirp) cubic phase correction can be chosen to be positive, zero or negative. Spherical aberration is not dependent on whether the beam is on- or off-axis. The only method to control quartic phase is by controlling the size of the spatially chirped beam and by choosing the proper combination of concave and convex lenses. This control is very efficient due to fourth-order dependence of the spherical distortion on the beam size.

For a lens system, chromatic aberration has also to be taken into account when designing the system. Chromatic aberration contributes to the cubic-phase distortion of an ultrashort pulse and is not dependent on the beam size. However, the inventors' ray tracing results show that typically this additional cubic-phase due to chromatic aberration is negligible compared to the amount of coma-induced cubic phase in an experimental system according to the present invention, and can be easily compensated.

Therefore, it is possible to design the system with a required amount and sign of phase distortion for any of the orders by choosing proper lenses, magnification factor, angle of propagation through the telescope, size of the spatially chirped beam and the profile of the spatial chip. If large amounts of phase distortion have to be obtained, several telescopes can be cascaded. Cascading several telescopes allows to enlarge the spatially chirped beam and to increase the effect of the aberrations. Equivalently, the focal lengths of the lenses can be reduced to increase aberrations. For example, in FIG. 4(a) two telescopes 14 and 24 are cascaded so as to expanded the beam and increase the quartic and quintic terms (if present). On the other hand, in FIG. 4(b) telescopes 34 and 44 are cascaded in a manner which preserves the beam's size. The arrangement of FIG. 4(b) is advantageous insofar as it is easier to align and is more robust. It should be noted, however, that practical limitations are imposed by the minimum numbers obtainable with the lenses.

The amount of different GVD orders induced by a particular aberration telescope can be calculated using its Seidel coefficients for spherical aberration A040 and coma A031 (M. Born and E. Wolf, Principles of Optics, Pergamon Press, Oxford, 1975, chps. 5 and 9):

$$|\beta_3| = \frac{|A_{031}|12\pi}{(\omega-\omega_0)^3},$$

$$|\beta_4| = \frac{|A_{040}|48\pi}{(\omega-\omega_0)^4},$$

wherein $(\omega-\omega_0)$ is frequency spread over the radius of the beam.

Figure 5:
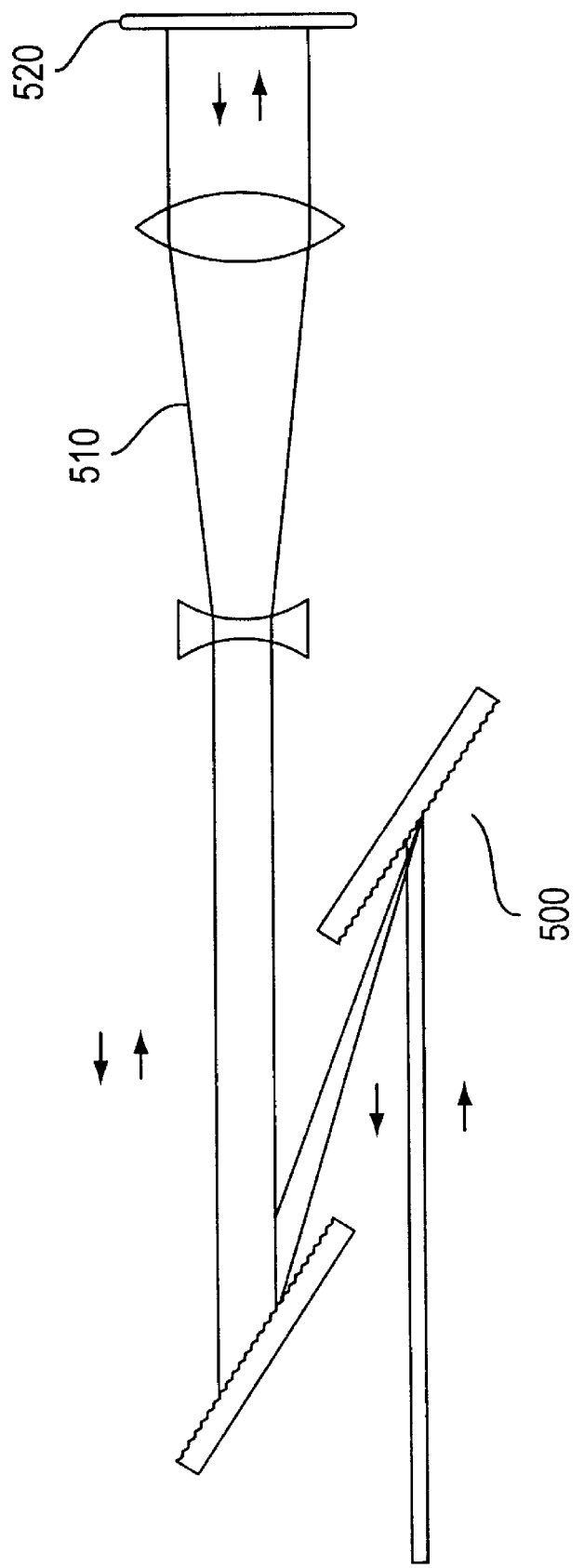
FIGS. 5(a)–5(e) depict various arrangement for using the telescope according to the present invention.
Figure 5:
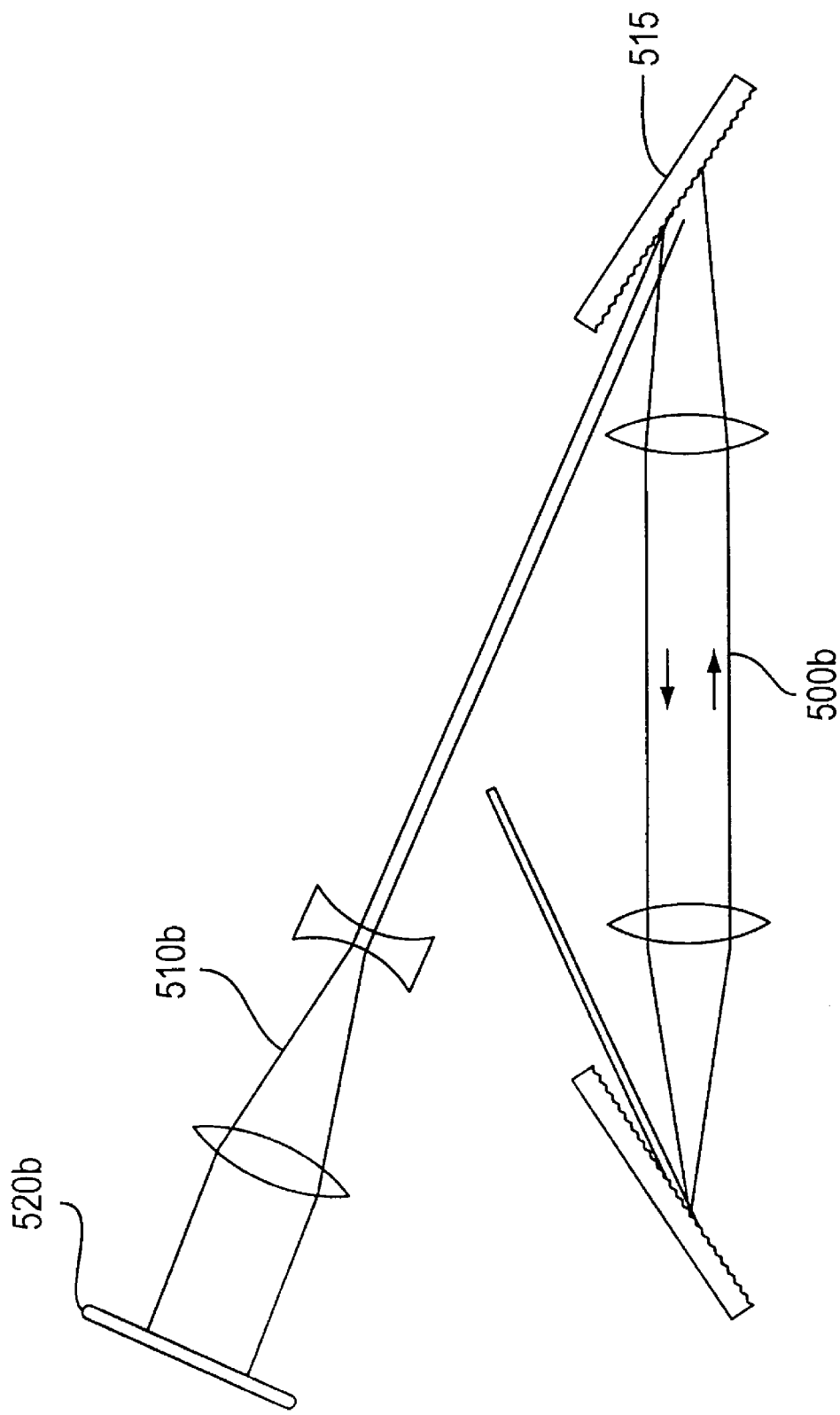
Figure 5:
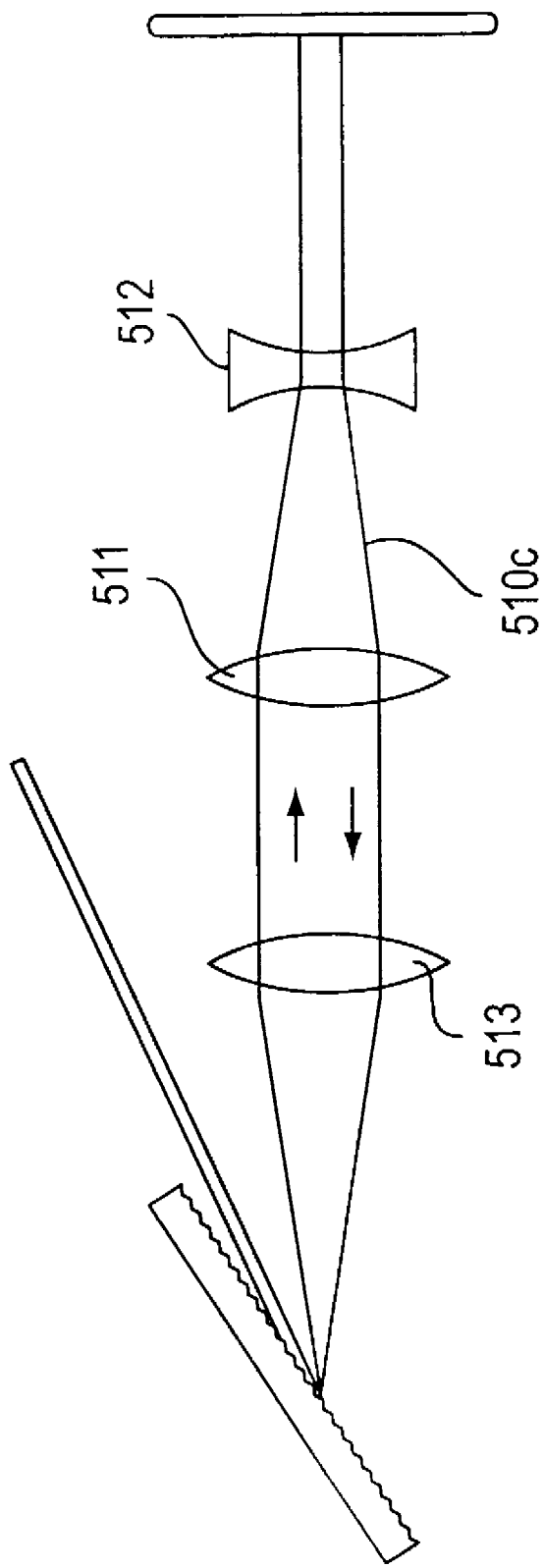
Figure 5:
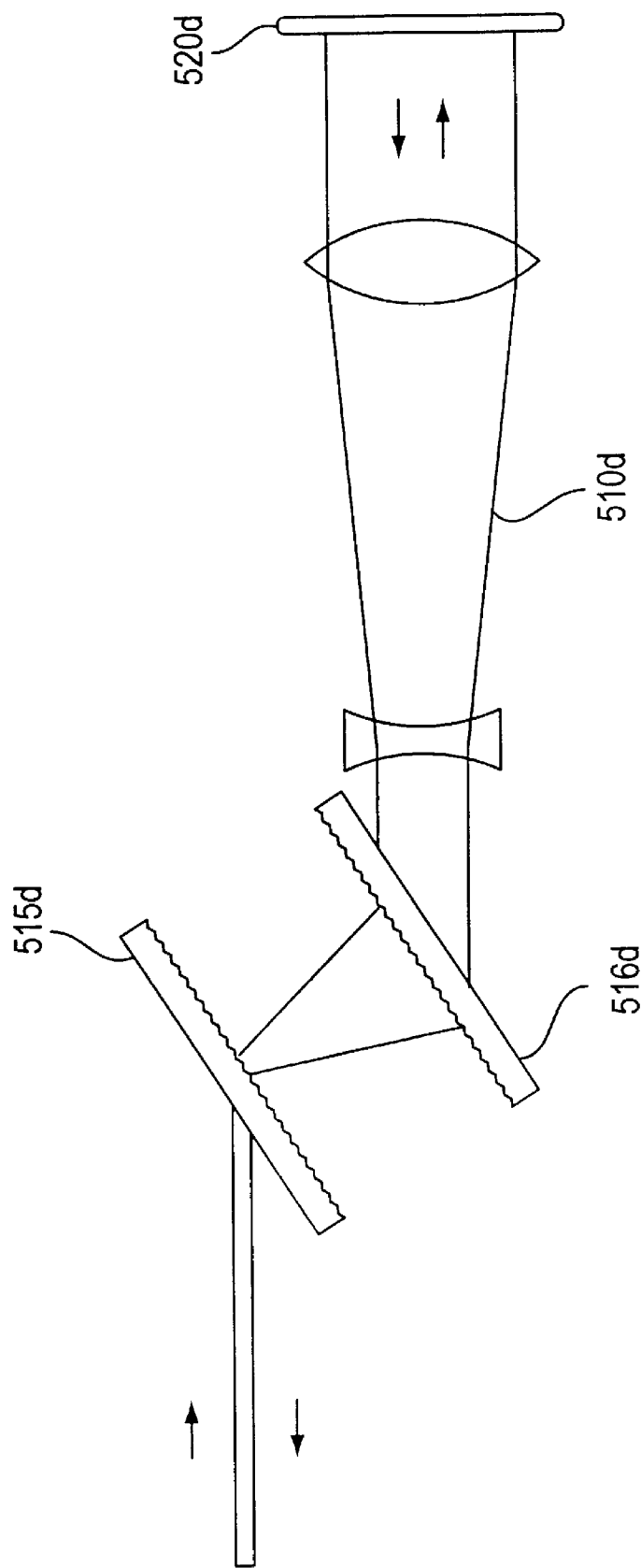
Figure 5:
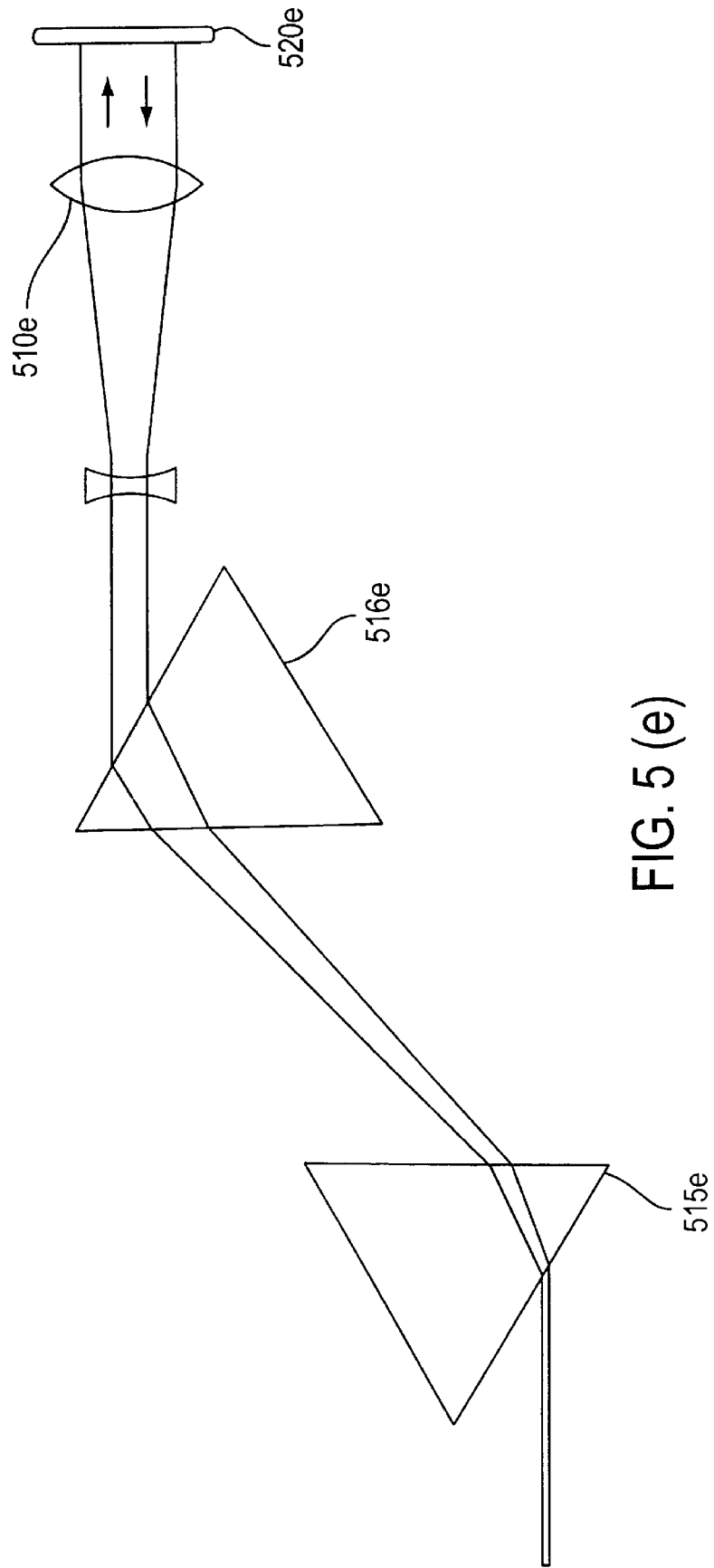

Different embodiments of the present invention, wherein telescopes are incorporated into pulse stretching and compressing arrangements, are demonstrated in FIGS. 5(a)–5(e). Telescopes can be used with diffraction gratings, prisms or any other possible elements, which produce spatially chirped beams for ultrashort optical pulses. Notably, the diffraction element can be either reflective (reflection diffraction grating, mirrors etc.) or transmissive (transmission grating, etc.). In addition, a transmission disperssive element (such as a prism) can also be used. FIG. 5(a) shows an exemplary embodiment wherein the telescope 510 is inserted between a diffraction-grating compressor 500 and a reflector 520. In FIG. 5(a), the compressor 500 comprises reflection diffraction-grating arrangement with negative dispersion. On the other hand, in FIG. 5(b), the telescope 510b is used with diffraction-grating compressor 500b with a positive dispersion. The telescope is inserted between grating 515 and reflector 520b. An arrangement with zero dispersion is exemplified in FIG. 5(c). For the configuration exemplified in FIG. 5(c), either of the telescope lenses 511, 512 or the collimating lens 513 should be cylindrical, because the beam after the diffraction grating is diverging only in the plane of diffraction and is collimated in the perpendicular plane.

FIG. 5(d) shows that equivalent configurations can be obtained with transmission diffraction gratings. Advantage of arrangements with transmission gratings is that they can be more compact than reflective-grating arrangements. In the particular example shown in FIG. 5(d), the telescope 510d is inserted between the transmission diffraction grating 516d and the reflector 520d. This arrangement can be made equivalent to that shown in FIG. 5(a). Transmission diffraction grating can also be used to provide arrangements equivalent to those shown in FIGS. 5(b) and 5(c).

FIG. 5(e) shows an example wherein prisms are utilized as the dispersive elements. In the particular example shown, the spatial chirp might be nonlinear, allowing for higher than the fourth-order phase control. In a manner similar to the examples of FIGS. 5(a) and (d), in FIG. 5(e) the telescope 510(e) is inserted between the prism 516e and the reflector 520e. Of course, other arrangements will be apparent to those skilled in the art.

While in the embodiments of FIGS. 5(a) . (e) lenses are used, equivalent systems can be designed by replacing the lenses with spherical mirrors. Additionally, spherical optics can also be replaced with aspherical components changing the amounts of primary Seidel aberrations and, consequently, the magnitudes of phase orders. This gives additional flexibility for different designs.

The advantages of using dispersion-controlling configurations proposed in the invention are revealed by the exemplary CPA arrangements shown in FIGS. 6(a)–6(h). According to the present invention, systems giving any arbitrary amounts of second, third and fourth order phase contribution allow to combine different types of stretching/compressing devices and to compensate for highly nonlinear frequency chirp (e.g., of laser diode or selfphase-broadened pulses). In contrast, conventional diffraction-grating devices give a fixed ratio between different dispersion orders and limit possible arrangements to Martinez-Treacy type dispersion matched stretcher/compressor pair. FIGS. 6(a)–(e) demonstrate that compactness of the CPA system can be substantially increased by using compact fiber and fiber-grating pulse stretchers or tunable laser diodes as sources of chirped optical pulses at the input of a CPA. Conventional compressors are used to compress the pulse after the amplification stage. Compatibility between the compact devices (fiber stretchers and laser diodes) and the Martinez-Treacy type compressors is accomplished by using the telescope according to the present invention.

Figure 6A:
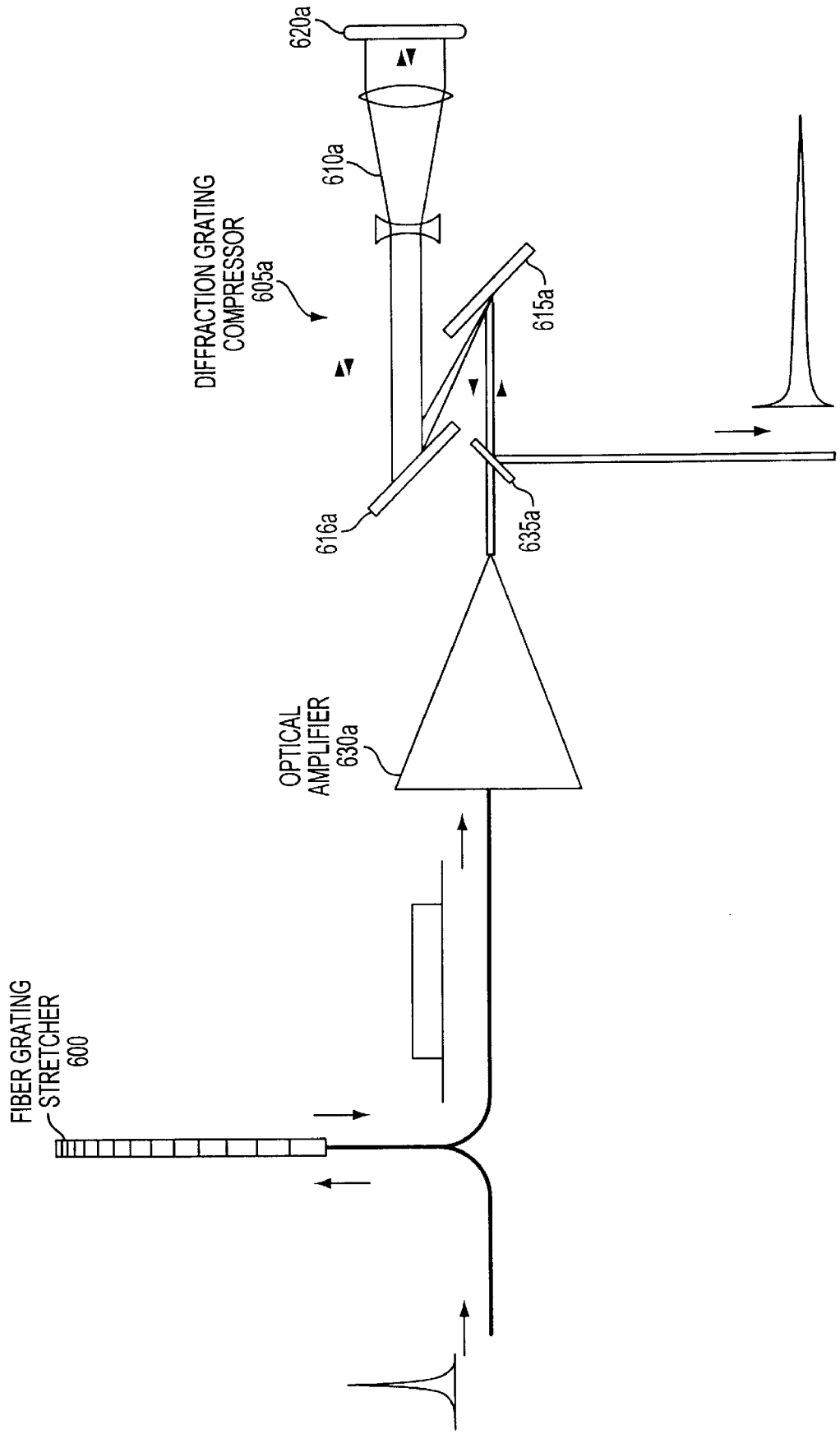
FIGS. 6(a)–6(h) depict various systems according to the present invention.
Figure 6B:
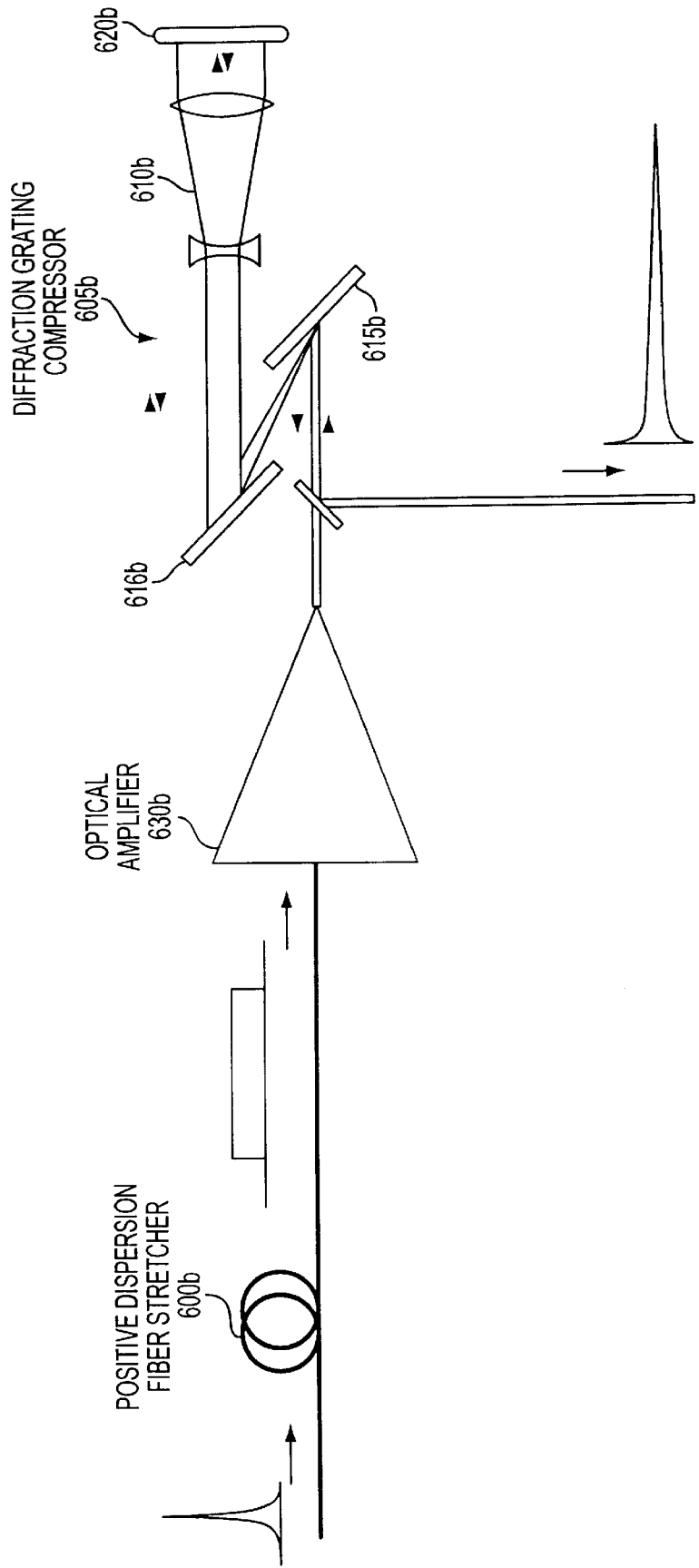

For example, in the configuration of FIG. 6(a) a chirped fiber grating 600 is used as a stretcher. The stretched pulse is then applied to an optical amplifier 630a and, thereafter, is passed through a transmission mirror 635a into the compressor 605a. The compressor shown in this particular example uses two reflection diffraction gratings 615a and 616a. However, as noted above with respect to FIGS. 5(a)–5(e), other arrangements and optical elements may be used. In order to compensate for the large GVD mismatch between the stretcher and the compressor, a telescope 610a is inserted in the path between grating 616a and reflector 620a, as provided by the present invention.

Figure 6C:
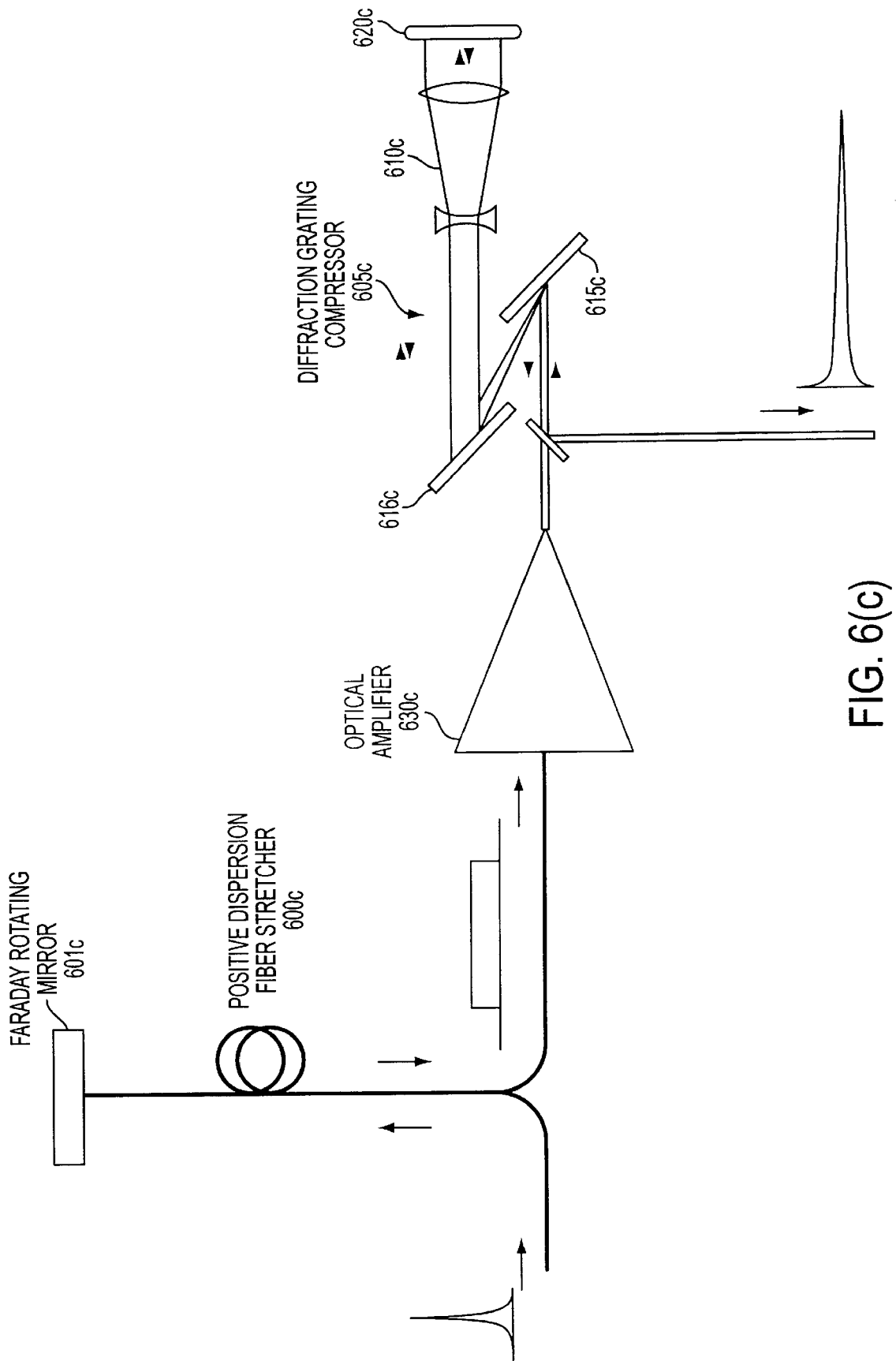

The exemplary system of FIG. 6(a) is advantageous over the systems of the prior art since the size of the fiber grating stretcher 600 (length~10 cm) for nanosecond stretched pulses is negligible compare to typical Martinez type stretcher (1–2 m length). Thus the overall size of the system is reduced by the present invention. Similar improvement can be achieved by using single-mode fiber for pulse stretching. The exemplary configuration shown in FIG. 6(b) uses positive dispersion fiber 600b in the transmission line. Otherwise, the basic exemplary system is similar to that shown in FIG. 6(a). The configuration exemplified in FIG. 6(c) is similar to that of FIG. 6(b), except that a Faraday rotating mirror 601c is placed at the end of fiber stretcher 600c to double pass the fiber stretcher 600c and to eliminate effects caused by weak fiber birefringence.

Figure 6D:
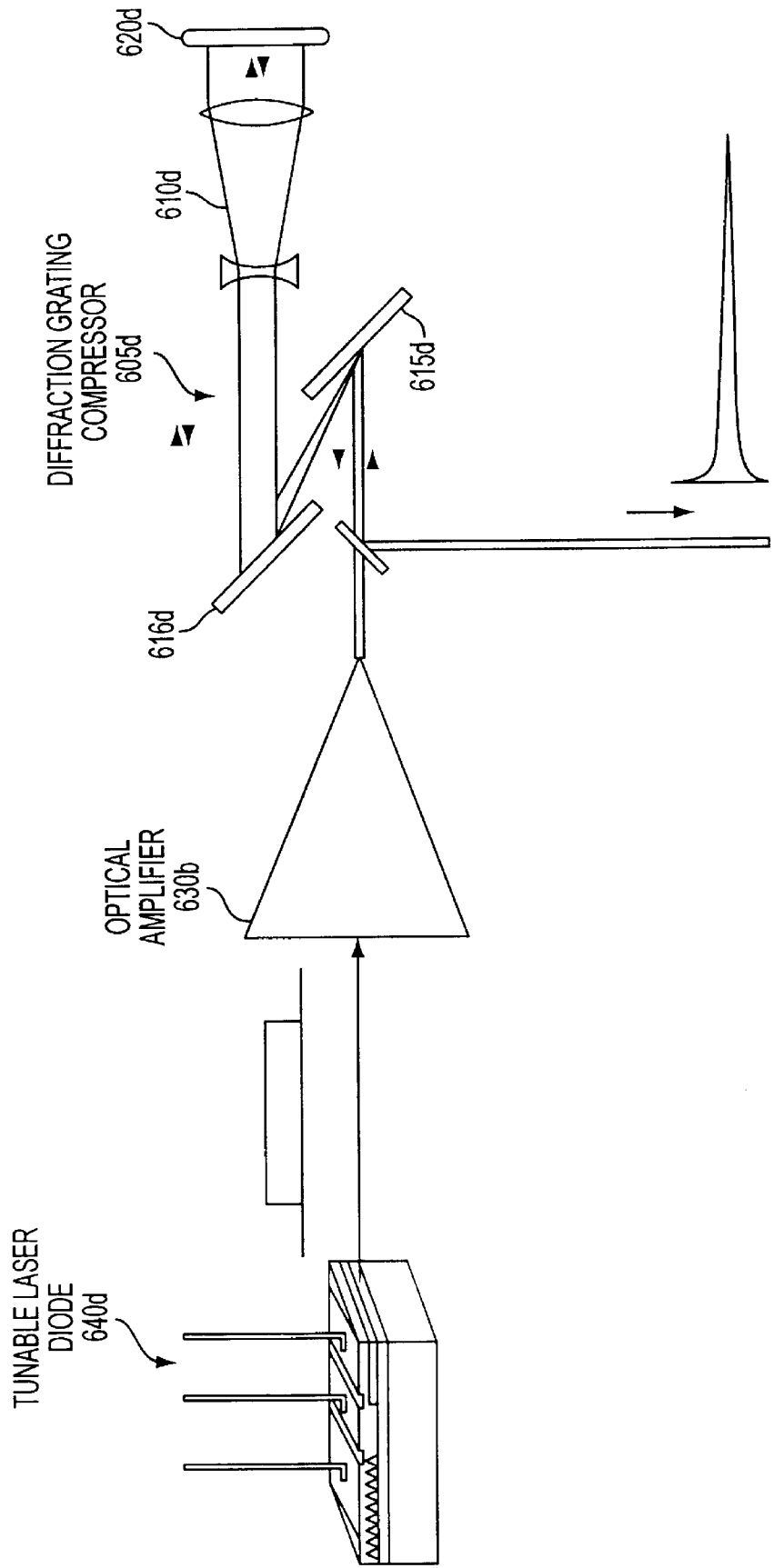

FIG. 6(d) shows an example using a tunable laser diode 640d as a source. Typical limitations on the compressed pulse duration obtained with such a diode are due to large higher-order chirp components which typically are larger than can be compensated with a standard diffraction-grating configuration (A. Galvanauskas, M. E. Fermann, P. Blixt, J. A. Tellefsen, D. Harter, "Hybrid diode-laser fiber-amplifier source of high-energy ultrashort pulses," Opt. Lett. 19, 1043 (1994)). An experimental system having compressor design according to the present invention was shown to compensate for this large higher-order chirp. The basic structure of the system shown in FIG. 6(d) is similar to that shown in FIGS. 6(a)–6(c) except that it uses the diode 640d as a source.

Figure 6E:
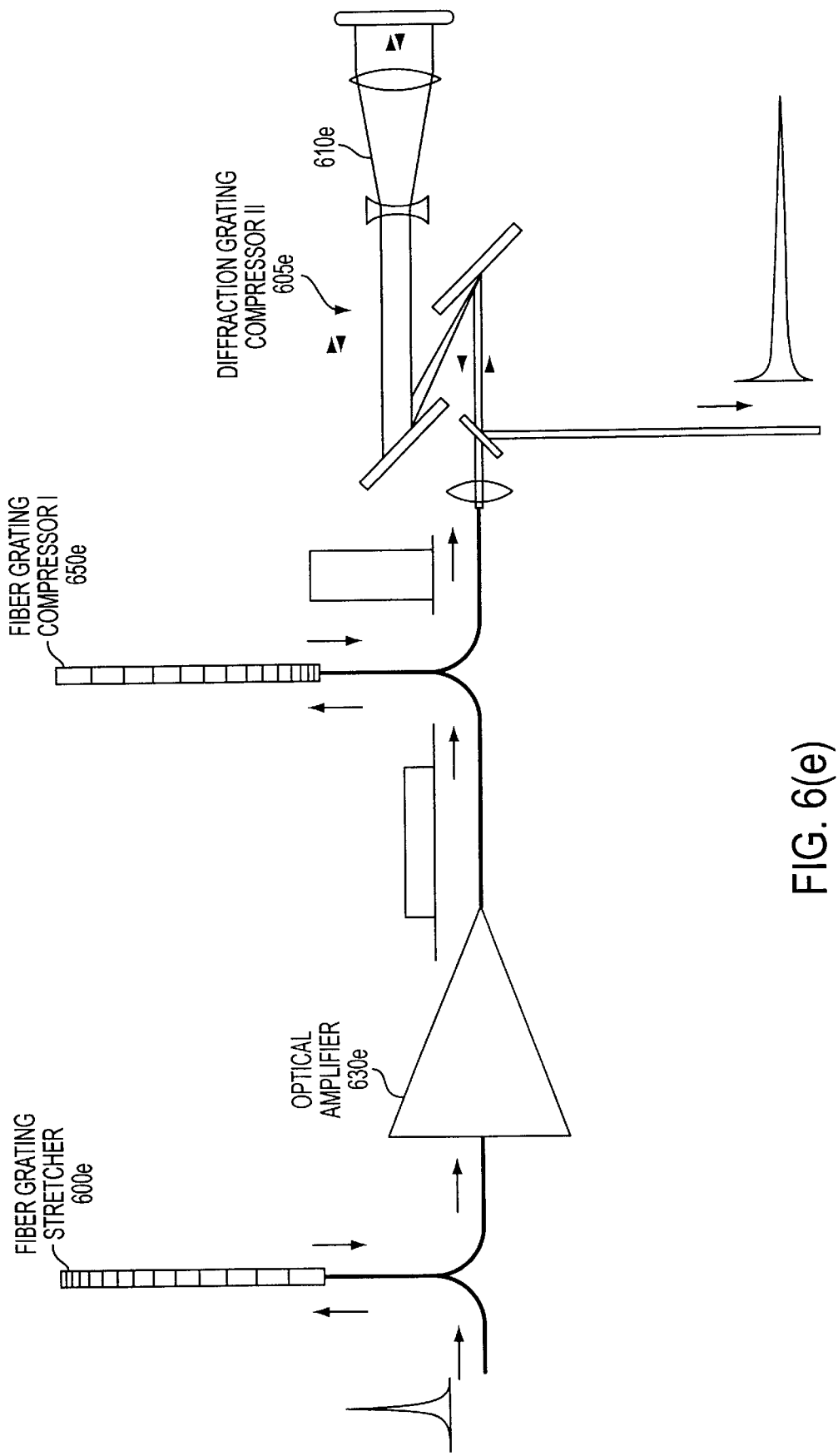

FIG. 6(e) shows an exemplary hybrid configuration. The pulses are stretched with a fiber grating 600e and applied to the optical amplifier 630e. Thereafter, the amplified pulses are partially compressed with fiber grating 650e. Final compression is achieved with a bulk compressor 605e, which can use either diffraction gratings or prisms as noted with respect to FIGS. 5(a)–5(e). Dispersion control using the telescope 610e according to the present invention is required in the bulk compressor both to compensate for any possible dispersion mismatch between the two fiber gratings and mismatch between the fiber grating and the bulk compressor.

The advantage of this arrangement is its extremely small size for the high pulse energies achievable. The size of the bulk compressor scales with the duration of the input pulses, and the two fiber gratings can be chosen to give only several picosecond pulses before the final compression. By allowing pulses not to reach high peak powers at the output port of the fiber grating, higher pulse energies can be reached without pulse distortions by nonlinear effects in the fiber.

Figure 6F:
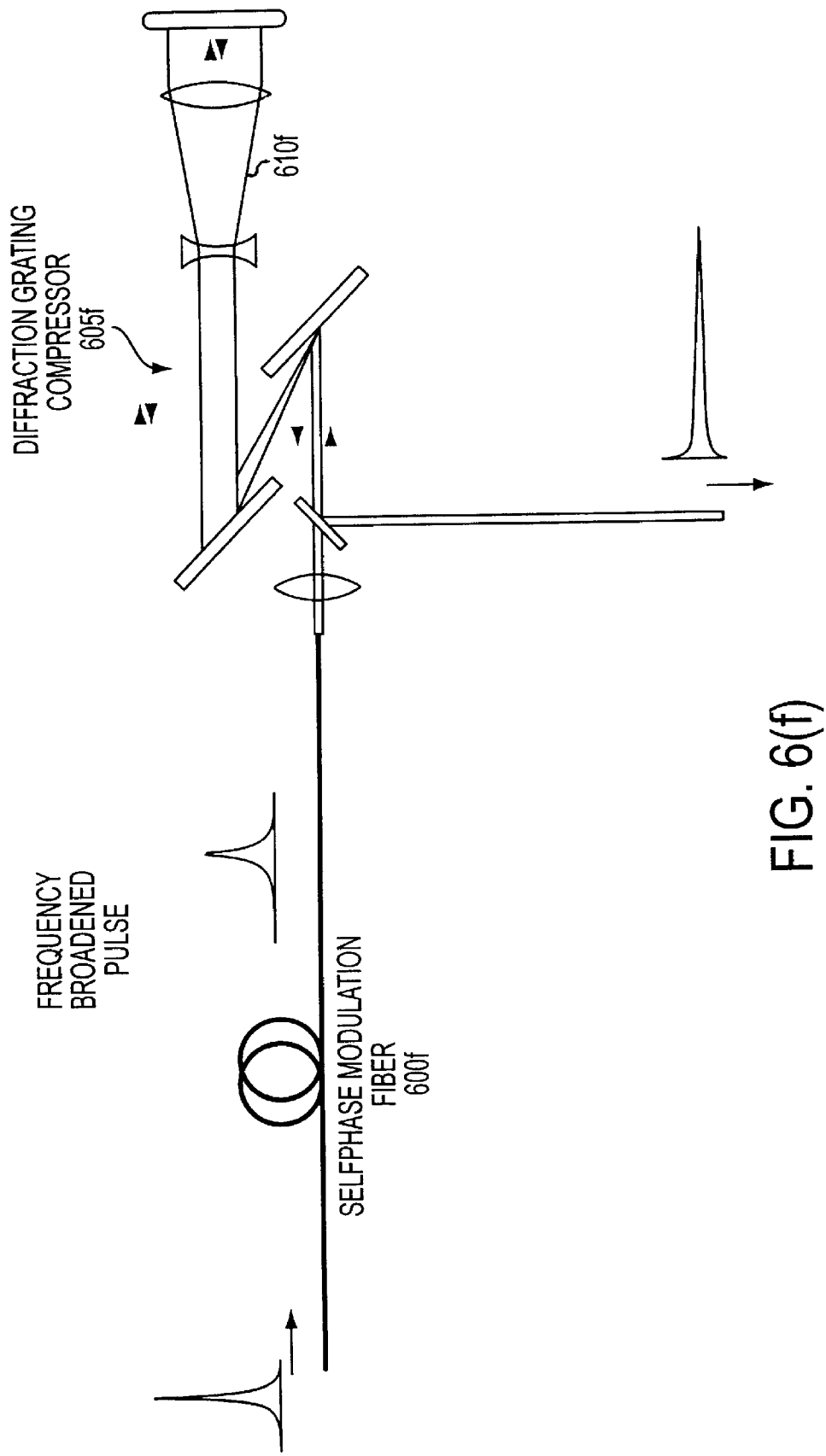

FIG. 6(f) shows an exemplary embodiment for compression of optical pulses spectrally broadened by selfphase modulation in an optical fiber. The general technique is often used to substantially shorten initial pulse durations. However, under many conditions selfphase modulation gives nonlinear frequency chip, which is difficult to compensate in a conventional compressor. As shown in FIG. 6(f), the propagating pulse is broadened in the self modulation fiber 600f. The broadened pulse is therefore applied to a compressor 605f which includes a telescope 610f. Thus, the system according to the present invention allows to correct for the arbitrary nonlinearities created by the selfphase modulation.

Figure 6G:
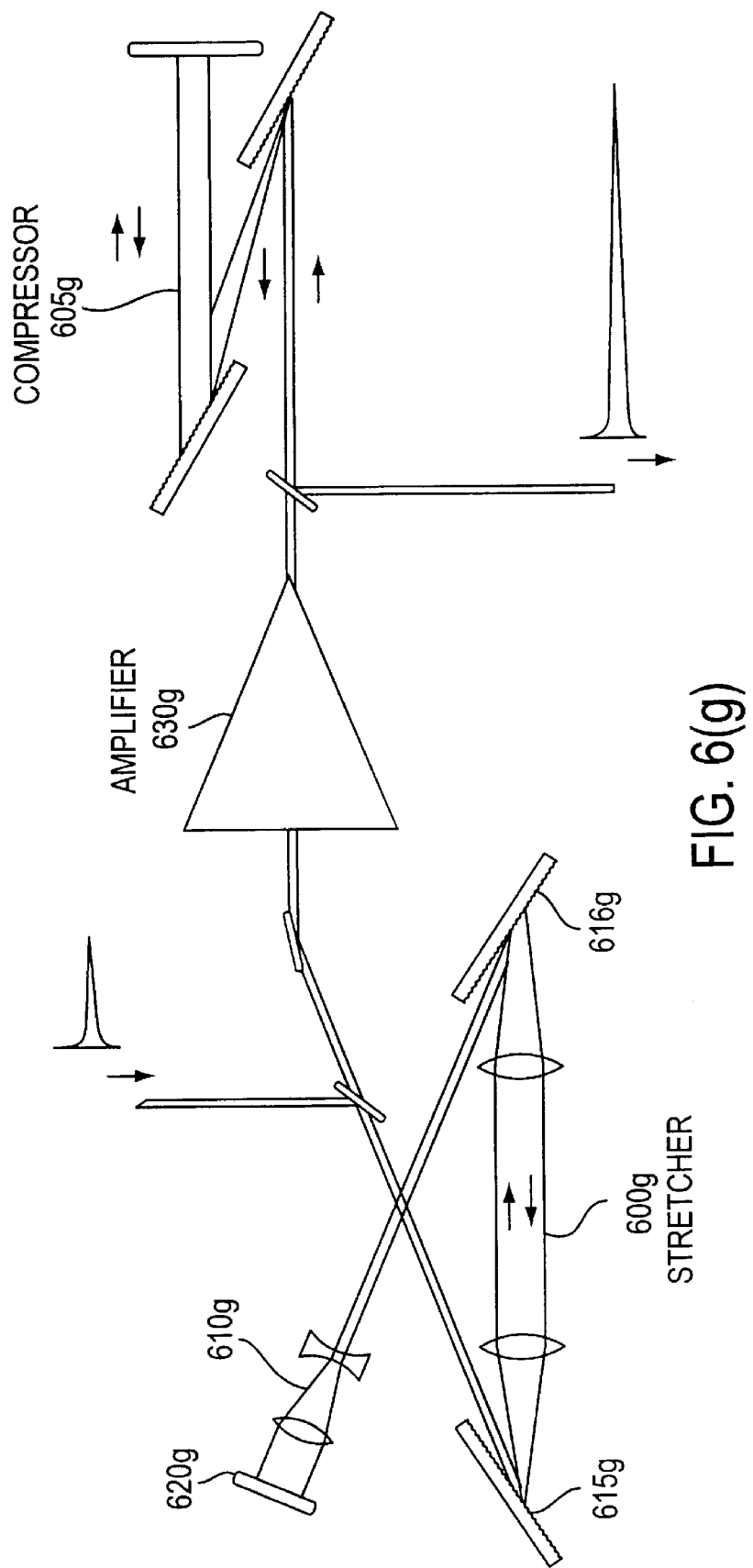

FIG. 6(g) shows an exemplary aberration-control arrangement used in addition to the conventional non-hybrid stretcher/compressor configuration. In a conventional Martinez/Treacy CPA configuration, one difficulty in matching the dispersion orders is to eliminate the impact of lens aberrations of the stretcher, which is usually limiting the duration of the recompressed pulses. These additional aberration induced distortions are particularly detrimental at longer wavelengths. Analysis based on ray tracing reveals that even with the same amount of wavefront aberrations, pulse phase distortions in such a stretcher at ~1550 nm are approximately by an order of magnitude larger compared to 800 nm wavelength band. Using the method of the present invention, this phase distortion can be eliminated.

An additional advantage of the embodiment shown in FIG. 6(g) relates to dispersion caused by the amplification stage. That is, dispersion in the amplifier material and components requires to slightly mismatch the stretcher and compressor grating separation. This allows to compensate for additional linear GVD. However this mismatches all higher order GVD. For a small mismatch in a conventional arrangement it is possible to compensate higher order GVD terms by setting the gratings at a certain mismatched angles and certain distances. Apart from being very complicated and limited in magnitude, as noted above, this method usually results in operating the diffraction grating far from the Littrow angle. As is known, at Littrow angle diffraction efficiency is the highest and is preferable for minimizing pulseenergy loses in the compressor. However, using the telescope according to the present invention, better control of the higher terms of the GVD is provided and the efficiency can be enhanced.

As shown in FIG. 6(g), the pulse is first stretched in a Martinez-type stretcher 600g having a telescope 610g inserted between the diffraction grating to. 616g and the reflector 620g. The stretched pulse is amplified by the amplifier 630g and then compressed in a conventional Treacy-type compressor 605g. By using the telescope 610g as disclosed by the present invention, phase distortion due to lens aberrations of the stretcher can be eliminated.

Figure 6H:
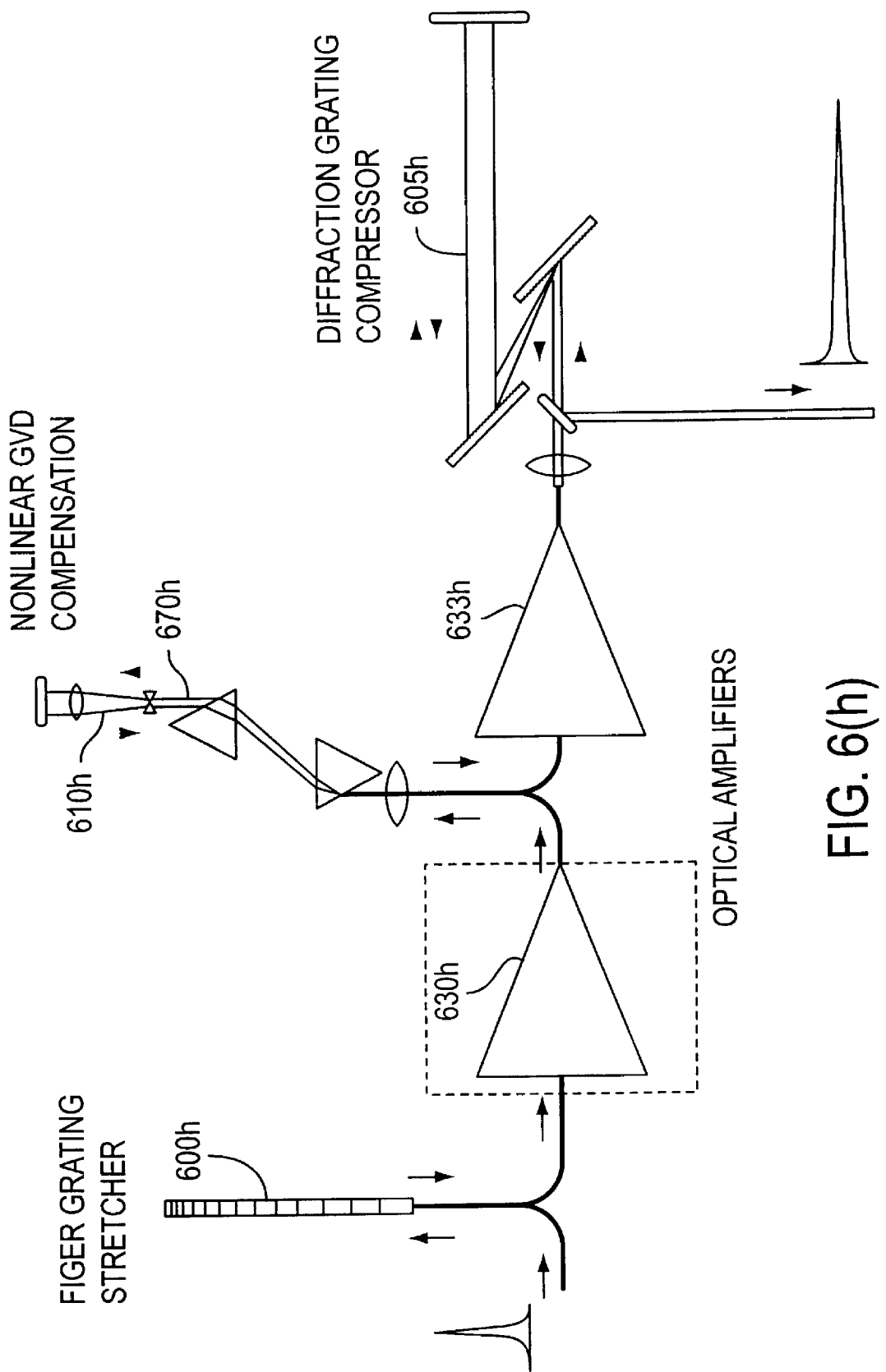

The configurations shown in FIGS. 5(c), (d) and (e) can be arranged to have very small linear GVD. This is useful, e.g., in the system where nonlinear phase compensating arrangement is inserted between different amplification stages to avoid additional components in the final compression arrangement. An example of such a system is depicted in FIG. 6(h), wherein the pulse is stretched in a fiber grating stretcher 600h, amplified by an optional optical amplifier 630h, compensated in the nonlinear GVD compensator 670h, further amplified by optical amplifier 633h, and finally compressed in compressor 605h. Notably, in this example the telescope 610h of the present invention is inserted in the compensator 670h rather than in the compressor 605h.

Ideally such additional compensation arrangement should have negligible linear GVD and large nonlinear GVD. Large linear GVD has to be compensated only in the final compressor 605h which, in this particular example, is a conventional Treacy-type compressor. One advantage of this configuration is that the beam quality in the final compressor 605h will not be affected by the amount of aberrations employed for the nonlinear GVD compensation 670h, provided that single-mode fiber amplifier output mode is independent of the input conditions.

It is useful to note that fourth-order phase compensation by the spherical aberration is a unique feature of the present invention, compare to conventional diffraction-grating or prism pulse compressors, where fourth-order control is very difficult to achieve. Fourth-order compensation is essential for obtaining recompressed pulses shorter than 100 fs. Thus, the present invention makes it viable to construct robust systems employing pulses of 100 fs or shorter.

Another method of compensating large GVD mismatches is shown in FIG. 7(a). A Bragg structure (e.g., a fiber grating) can be designed to have a grating pitch which varies nonlinearly along a fiber (chirped grating). Presently, chirped fiber bragg gratings having pitch that varies linearly along the fiber are used for stretching and recompressing femtosecond and picosecond pulses in a CPA system (See, U.S. Pat. No. 5,499,134). However, as noted above, presently linearly chirped fiber grating can be used as stretchers only in systems where fiber gratings are also used as the compressors. Otherwise, if bulk compressors are used, means for accounting for the GVD —such as the telescope of the present invention—needs to be included.

According to another aspect of the invention, a compact fiber stretcher is used together with a bulk compressor wherein nonlinear phase correction is achieved by using a nonlinearly chirped fiber bragg grating. According to this aspect of the invention, the grating period is designed as a nonlinear function of the coordinate along the fiber, so that the resulting dispersion will also have the corresponding nonlinear terms. Thus, for second, third and fourth order phase compensation, the grating period should be a nonlinear function of the longitudinal coordinate having linear, quadratic, cubic, etc., chirp components respectively. Gratings having nonlinear period can be written into, for example, an optical fiber, using a nonlinearly chirped phase mask (see, R. Kashyap et al. Novel Method of Producing All Fibre Photoconduced Chirped Gratings, Electronics Letters, 9th Jun., 1994, Vol. 30, No. 12, pp. 996–997), or using the dissimilar-wavefront technique (see, K. Sugden, Dissimilar Wavefront Technique for Linear and Quadratic Chirps, Conference Proceedings: Photosensitivity and Quadratic Nonlinearity in Glass Waveguides; Technical Digest Series Vol. 22, Paper SUB 12, 1995). The phase-mask writing technique is preferable since the mask can be easily manufactured to have the required nonlinear chirp in the longitudinal coordinate.

Figure 7:
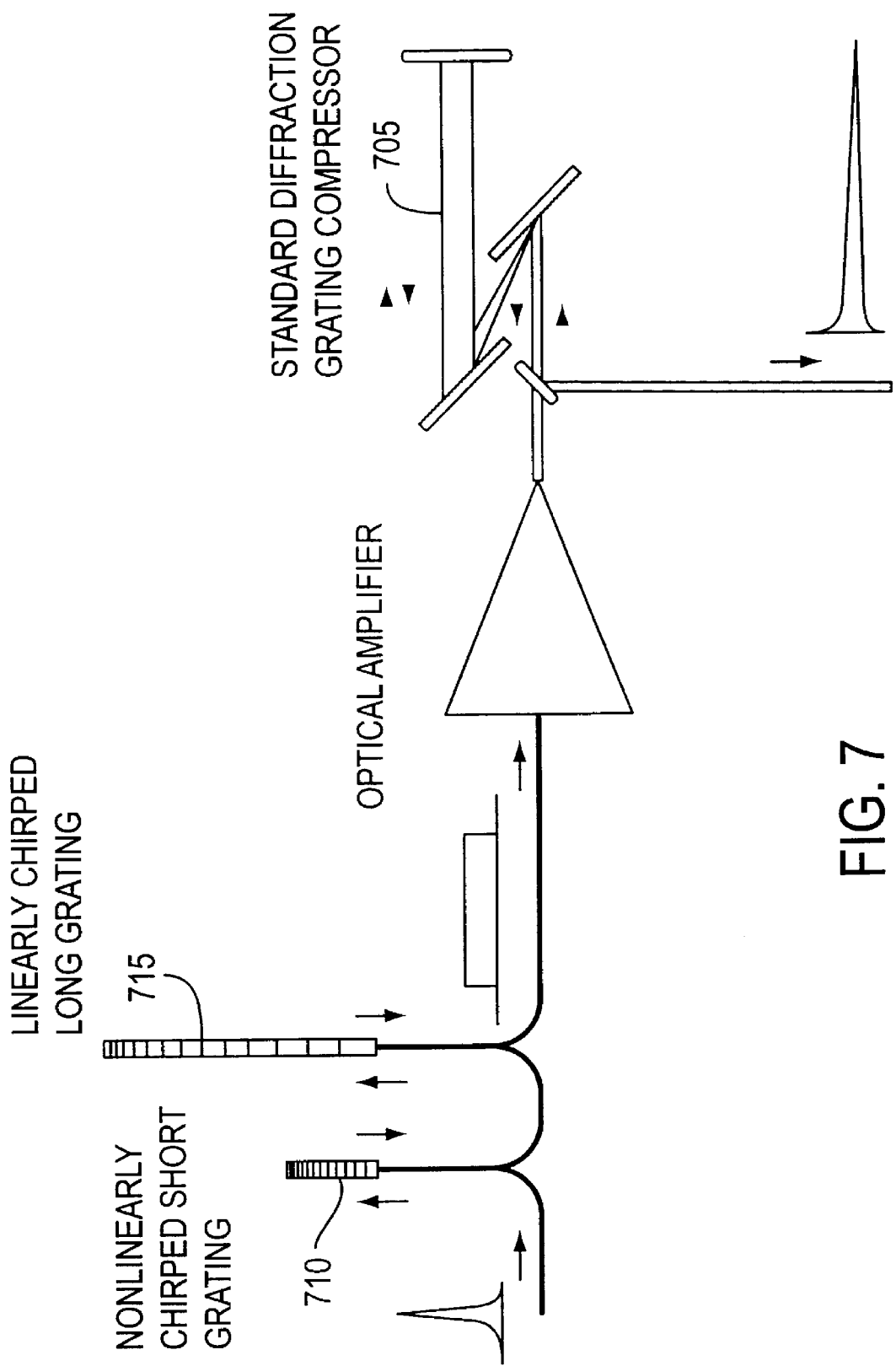
FIGS. 7 depicts methods for compensating GVD using non-linearly chirped fibers according to an aspect of the present invention.

In one example, a CPA system is constituted from a nonlinearly chirped Bragg-grating stretcher (not shown) and a conventional diffraction-grating pulse compressor 705(see FIG. 7). The nonlinear chirp of the Bragg grating is designed to match the dispersion orders of the conventional compressor 705. Specifically, the GVD terms for a typical diffraction grating compressor are $|\beta_2| \approx 50 \cdot 10^{-24} s^2$, $|\beta_3| \approx 1 \cdot 10^{-36} s^3$, $|\beta_4| \approx 50 \cdot 10^{-51} s^4$, which have to be matched by the corresponding dispersion orders of Bragg grating. It should be noted that terms higher than fourth order are not important for recompressed pulse durations longer than $\approx 100$ fs.

While this aspect of the present invention uses a single nonlinearly chirped fiber grating, practical limitations may be imposed by the precision achievable by the particular manufacturing technique used. For nano-second stretched pulses, grating length should be about 10 cm. For a typical pulse bandwidth of about 15 nm at 1550 nm center wavelength, linearly chirped grating requires about 1% grating pitch variation along the grating. To achieve the above value of $|\beta_3|$ and $|\beta_4|$ with a given bandwidth and such a long grating, the additional nonlinear pitch variation would be 10 to 100 times smaller than the 1% pitch variation of the linear grating. This would require the highest precision achievable with the currently available phase-mask technology.

Accordingly, it is preferable for this aspect of the invention to use the fiber grating arrangement shown in FIG. 7. As shown in FIG. 7, two fiber gratings are used. Linearly chirped grating 715 is used as a conventional fiber grating stretcher, while nonlinearly chirped grating 710 provides the required nonlinear phase correction. In this particular example, grating 715 is of about 10 cm and provides linear GVD, while grating 710 is about 10 to 100 times shorter and provides third and fourth order nonlinear phase correction.

For N times shorter grating and fixed pulse bandwidth magnitude of the required nonlinear pitch variation increases by the same N factor. Therefore, for 1 mm to 1 cm short gratings the above required values of $|\beta_3|$ and $|\beta_4|$ can be achieved. Additional pulse energy losses due to connecting gratings 710 and 715 in series are not essential at the stretching stage, because they can be easily compensated with additional gain of an optical amplifier.

2. Hybrid fiber and solid-state amplifier:

If different types of gain material are used for the seed source and for the amplifier, special care has to be taken to match the spectra of the injected pulse and the amplifier gain. It is widely recognized that efficient frequency conversion can be easier to achieve with short pulses, because conversion efficiency increases with pulse peak power. Use of ultrashort pulses for frequency conversion limits possible injection schemes to the one shown in FIG. 1(*a*), where an oscillator output can be frequency doubled to match the amplifier spectrum.

Figure 1A:
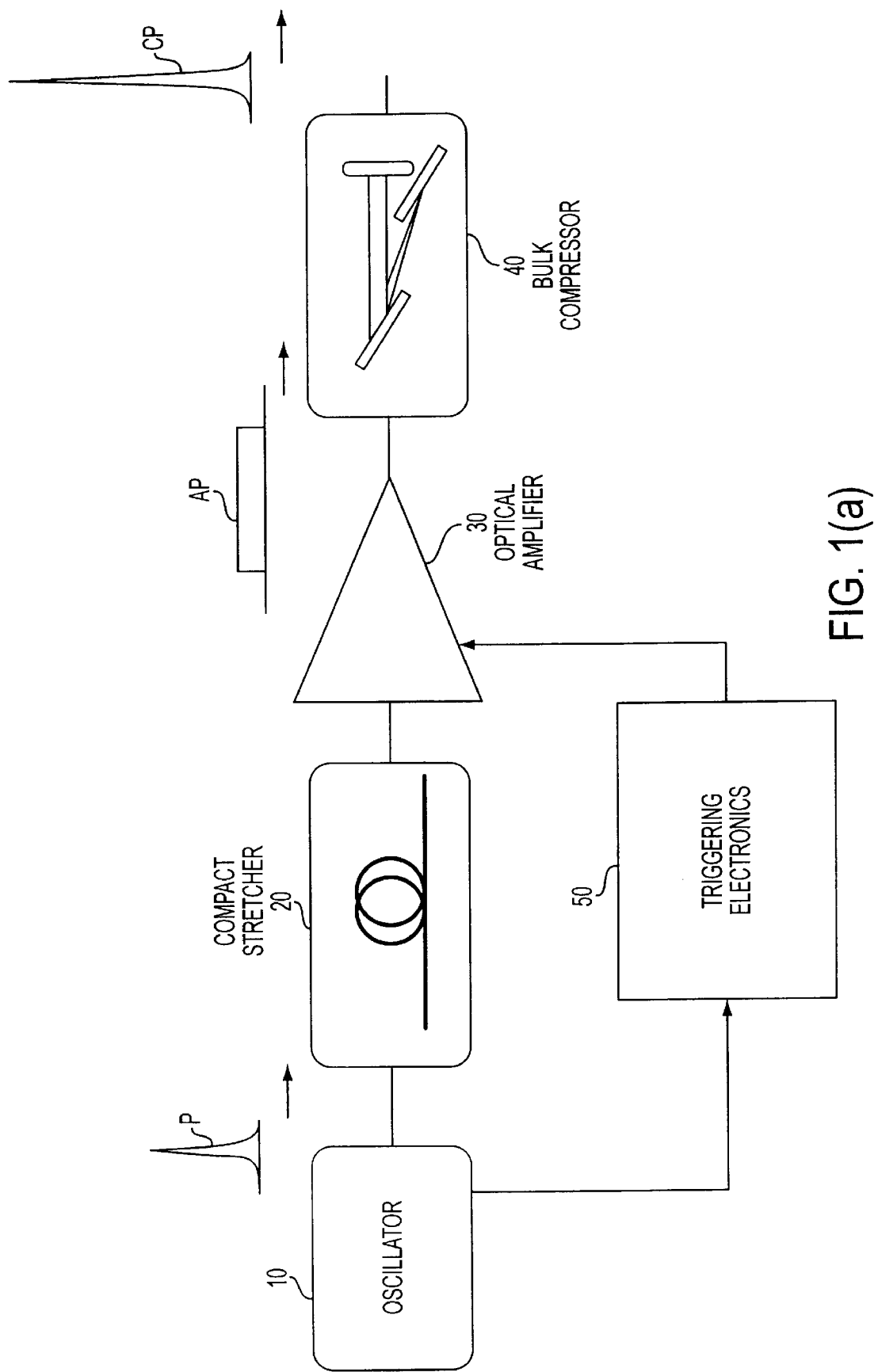
FIGS. 1(a) and 1(b) depict the general utilization of the features of the present invention in non-hybrid and hybrid systems, respectively.

It is one of the objects of the present invention to use frequency conversion of long, stretched optical pulses as means to match the spectra of a seed and an amplifier, such as shown in FIG. 1(*b*). This becomes practically possible due to 100 nJ–100 P pulse energies currently obtainable from a fiber amplifier source (M. E. Fermann, A. Galvanauskas, D. Harter, "All-fiber source of 100-nJ subpicosecond pulses, Appl. Phys. Lett. 64, 1315 (1994); A. Galvanauskas, M. E. Fermann, P. Blixt, J. A. Tellefsen, D. Harter, "Hybrid diode-laser fiber-amplifier source of high-energy ultrashort pulses." Opt. Lett. 19, 1043 (1994)), and availability of novel materials and techniques allowing for high optical nonlinearities (M. M. Fejer, G. A. Magel, D. H. Jundt, and R. L. Byer, "Quasi-Phase-Matched Second Harmonic Generation Tuning and Tolerances," IEEE J. Quant. Electron. QE-28, 2631 (1992)). As it is described in detailed embodiments, the present inventors have demonstrated conversion efficiencies of stretched pulses higher than 10%. This is more than sufficient for a practical use in the scheme of FIG. 1(*b*). It also has approximately the same conversion efficiency compare to a more traditional approach of recompressing, then frequency doubling and then stretching the second-harmonic pulse again, where the final efficiency of about 10% would be the product of the efficiencies of a compressor (~50%), a doubler (<50%) and a stretcher (~50%). Obviously the traditional approach is at a great disadvantage. Also, the use of the injection scheme in FIG. 1(*b*) gives a multitude of essential advantages compare to the scheme in FIG. 1(*a*).

The direct advantage is the substantial reduction of the size, increase of the robustness and considerable savings in the cost of the overall system. First of all, it is due to the fiber amplification system which replaces all the initial stages of the solid-state system. No additional stretchers and compressors are required. The seed source can occupy just the fraction of the space required for, e.g., traditional argon laser for pumping all-solid state systems. Such compact seed source is attractive for the use at the front end of any CPA system independently of the application. Second, due to microjoule seed energies available at short wavelengths, the size of the final solid-state high energy amplifier can be considerably reduced. The length of the regenerative amplifier is determined by the speed of a Pockels cell. Rise and fall times for the switched window have to be shorter than the pulse round-trip time in the amplifier cavity. The fastest Pockels cell switching into "on" and "off" states can be achieved with a high-voltage photoconductive switches, triggered with optical pulses.

Due to material properties currently available switches have to be triggered with short wavelength optical pulses (e.g., 800 nm). Rise times get shorter for higher switching pulse energies. Frequency doubled stretched optical pulses are ideal for fast switching. Typically stretched pulses have rise times of the order of 100–400 ps. For ~400 ps rise time on both "on" and "off" switches ~1 $\mu$J at ~800 nm are required (See, U.S. Pat. No. 5,384,798). With this speed the length of the regenerative amplifier can be shorter than ~30 cm. It is at least 6 times reduction compare to typical nanojoule pulse injection systems. The fast switching of the regenerative amplifier gives additional advantages. Shorter time window gives cleaner outputs due to less amplified spontaneous emission. Also, in a shorter cavity thermal lensing effects can be controlled better than in a longer cavity. This contributes to the overall increased robustness and reduced alignment tolerances of a short regenerative solid-state amplifier.

Figure 8:
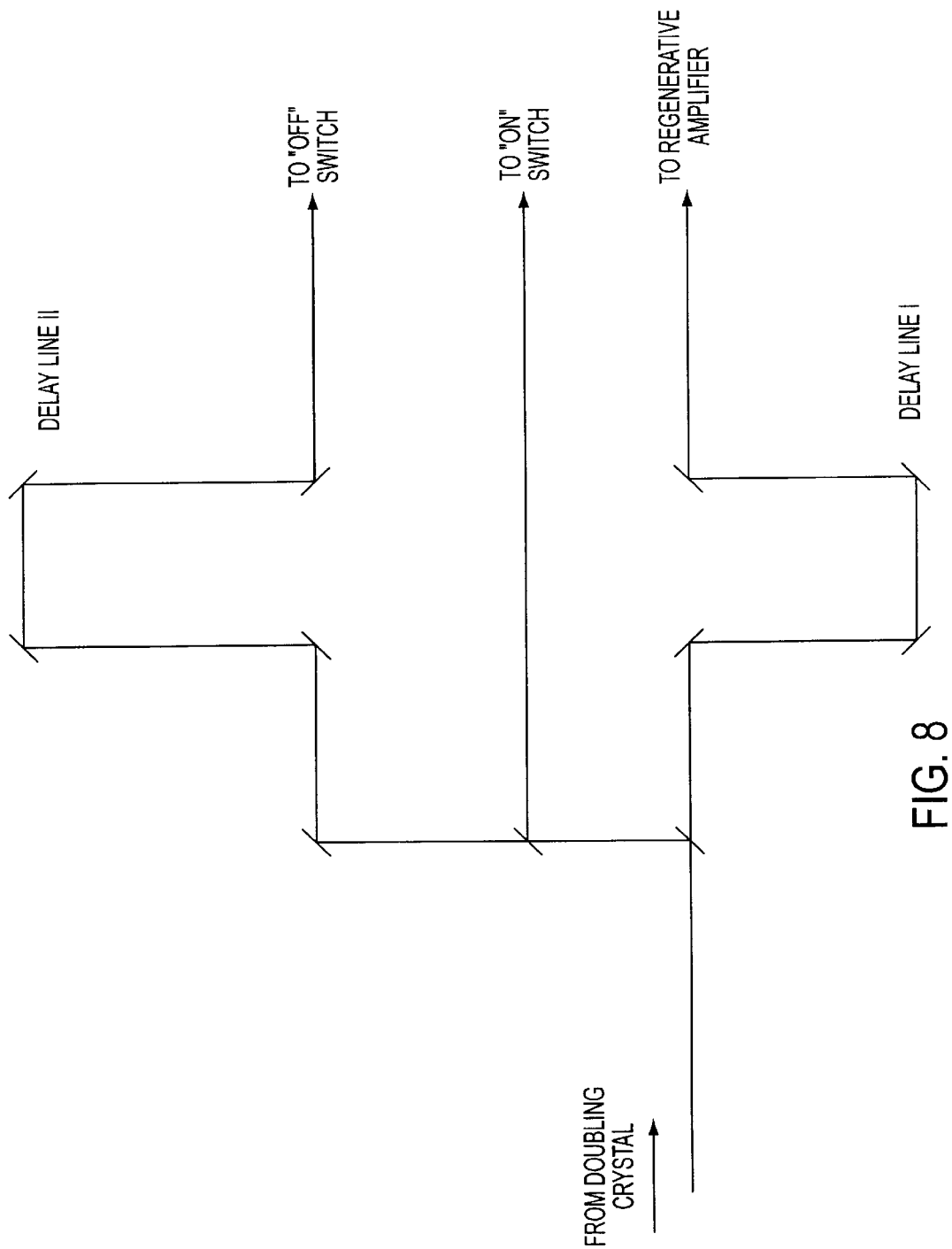
FIG. 8 depicts an exemplary arrangement for using frequency doubled stretched pulses for fast regenerative amplifier switching.

A scheme for using frequency doubled stretched pulses for fast regenerative amplifier switching is shown in FIG. 8. In this example, a frequency doubled pulse is split into three parts using partially reflecting mirrors and these pulses are used for pulse injection and "on" and "off" switches. Alterative way would be to use the nonconverted part of the stretched fundamental and to convert it into the second-harmonic with a separate crystal (or separate crystals for each of the two switches) to generate optical pulses for photoconductive switches. All second-harmonic power after the first crystal would be used for injection. Proper time delays have to be introduced between the pulses in both cases to ensure that the optical pulse will be injected within Pockels-cell time window.

The ability to seed solid-state amplifier with a microjoule second-harmonic pulse, as opposed to picojoule or nanojoule pulses typically used in existing injection systems, dramatically improves the contrast of the system. First, microjoule injected pulse extracts energy stored in the amplifier much more efficiently, practically eliminating ASE background. Second, the fidelity of recompressed pulses is expected to increase as a result of frequency doubling of stretched optical pulses. Typically, initial pulses from optical mode-locked oscillators already have some low-intensity temporal wings and pedestal, which spectrally are located in the wings of the spectrum. If after stretching the pulse duration is much larger than its bandwidth limit, the shape of the stretched pulses acquire the form of its spectral shape. Consequently, frequency doubling (whose efficiency is proportional to the square of the intensity) of these stretched pulses effectively "cleans" those low intensity wings both spectrally and temporally. Subsequent amplification of "clean" frequency-doubled pulses results in much lower pedestal of the recompressed pulses.

Additionally, frequency-doubling of stretched pulses act as a soft aperture, smoothing the spectral profile and allowing to further reduce the amount of energy in the temporal wings of recompressed pulses. This is important for commercially viable laser plasma drive x-ray sources, and other high intensity laser applications, in which $10^{19}$–$10^{20}$ W/cm$^2$ intensities are obtained by focusing amplified pulses and a contrast of up to $10^{10}$ is necessary to prevent the pedestal from ionizing the target. To date, this high of a contrast has not been achieved with any low-energy injected sources.

Other advantage of having microjoule rather than nanojoule pulses at the input of a regenerative amplifier is that it makes possible to control the amplified pulse spectrum.

First, gain narrowing effect in high-energy amplifier is strongly reduced due to much smaller gain required to reach high energies. Second, high-energy available for injection allows to use spectral pre-shaping in order to pre-compensate for the gain narrowing effect in the last amplification stages. Third, high energy is needed for different spectral broadening techniques (e.cg., using selfphase modulation) to increase the bandwidth of the pulses before injection to obtain very short pulses after recompression.

Figure 10A:
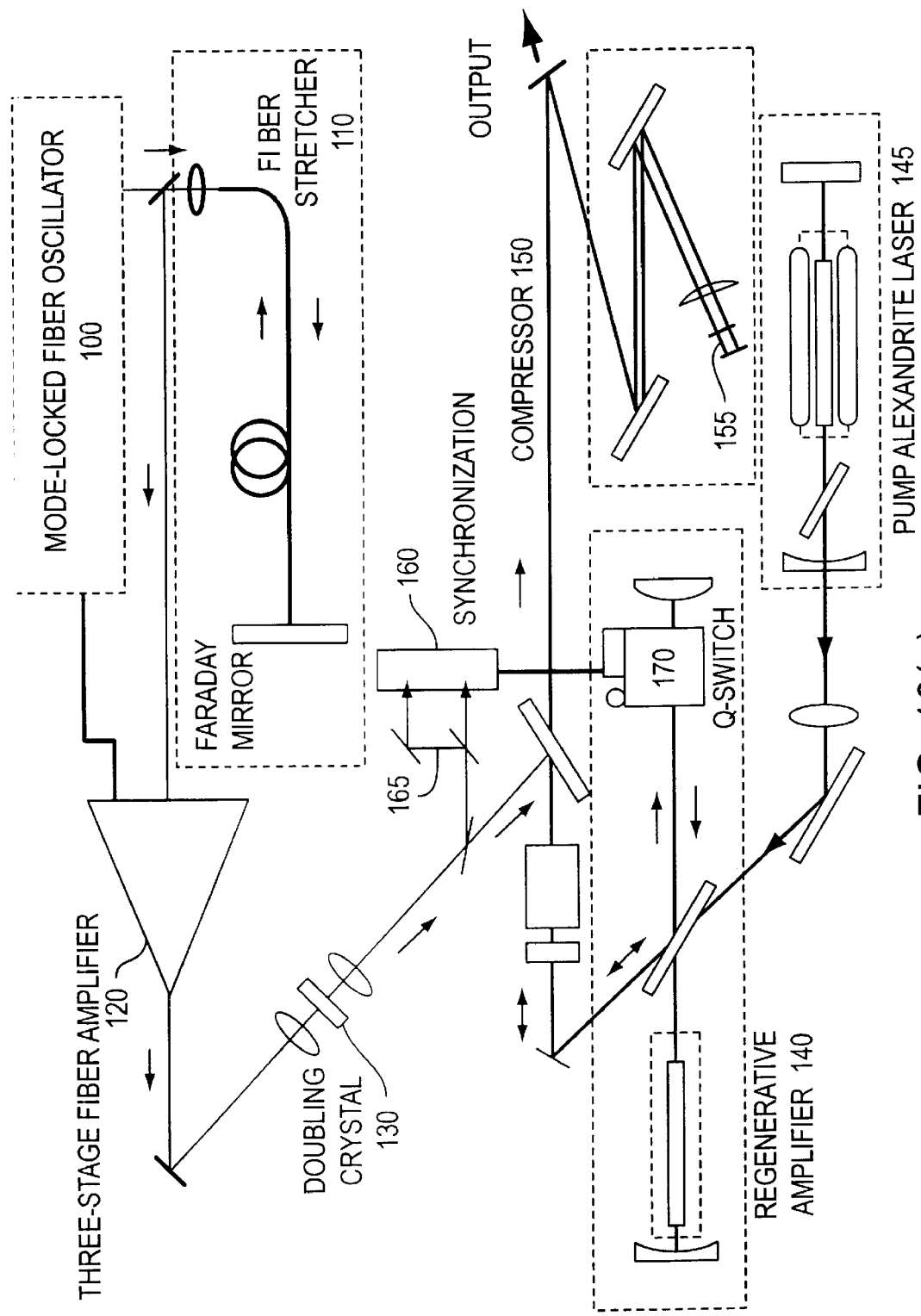

3. Exemplary Set-up of the Inventive CPA System:

FIG. 10(a) depicts an exemplary embodiment of a hybrid CPA system using a doubling crystal to double the frequency of stretched pulses according to a feature of the present invention. The particular exemplary embodiment of FIG. 10(a) comprises a mode-locked fiber oscillator 100, the light pulses of which are stretched by the fiber stretcher 110 which may be any of the fiber stretcher arrangements described above. the stretched pulses are then amplified in the three-stage fiber amplifier 120.

According to the above described feature of the present invention, a doubling crystal 130 is inserted in the light path after the pulses exit the amplifier 120. In addition, a splitting optics arrangement 165 according to FIG. 8 is used to split the doubled pulses and apply the doubled pulses onto the synchronization arrangement 160. In the embodiment of FIG. 10(a) the synchronization 160 is depicted to trigger a Q-switch 170 and to be responsive to the frequency doubled pulse.

However, it is important to point out that although at present it is advantageous to trigger photoconductive high-voltage switches with short wavelength pulses, further technological advances in material processing may enable the production of switches which can be triggered with low wavelength pulses (e.g., at 1.5 µm). This would allow to modify the exemplary embodiment of FIGS. 10(a) and 10(b) to use the fundamental wavelength of the injection source for the switching. This can be done by, for example, moving the splitting arrangement 165 into a location in the path between the amplifier 120 and the doubling crystals 130. Alternatively, the fundamental can be taken out after the frequency conversion by using known devices such as self switching crystals or Mach-Zender switches. Thus, while a Q-switched regenerative amplifier 140 is shown, it should be understood that the amplifier 140 may include any electro-optical switching arrangement.

As shown in FIG. 10(a) the other part of the split pulse is applied to the regenerative amplifier 140. In this preferred embodiment the regenerative amplifier 140 is an Alexandrite laser and it is pumped by a pump Alexandrite laser 145. As will be explained more fully below, the regenerative amplifier 140 is operated at about 50° C. while the pump Alexandrite laser is operated at an elevated temperature, such as 300° C.

The amplified pulse is then recompressed in the compressor 150. The compressor 150 can be any of the arrangements explained above which includes a telescope 155 according to the present invention. While this embodiment shows a specific arrangement of the various elements involved, various modifications and alterations will be apparent to those skilled in the art. For example, as noted, any of the stretcher-compressor arrangements exemplified above can be used. Similarly, other regenerative amplifiers and pump laser can be used, such as erbium doped fiber amplifier and erbium doped pump fiber. In addition, as previously noted, any electro-optical switching arrangement may be used. Moreover, the conventional switching electronics can be used instead of the electro-optical arrangement.

Figure 10B:
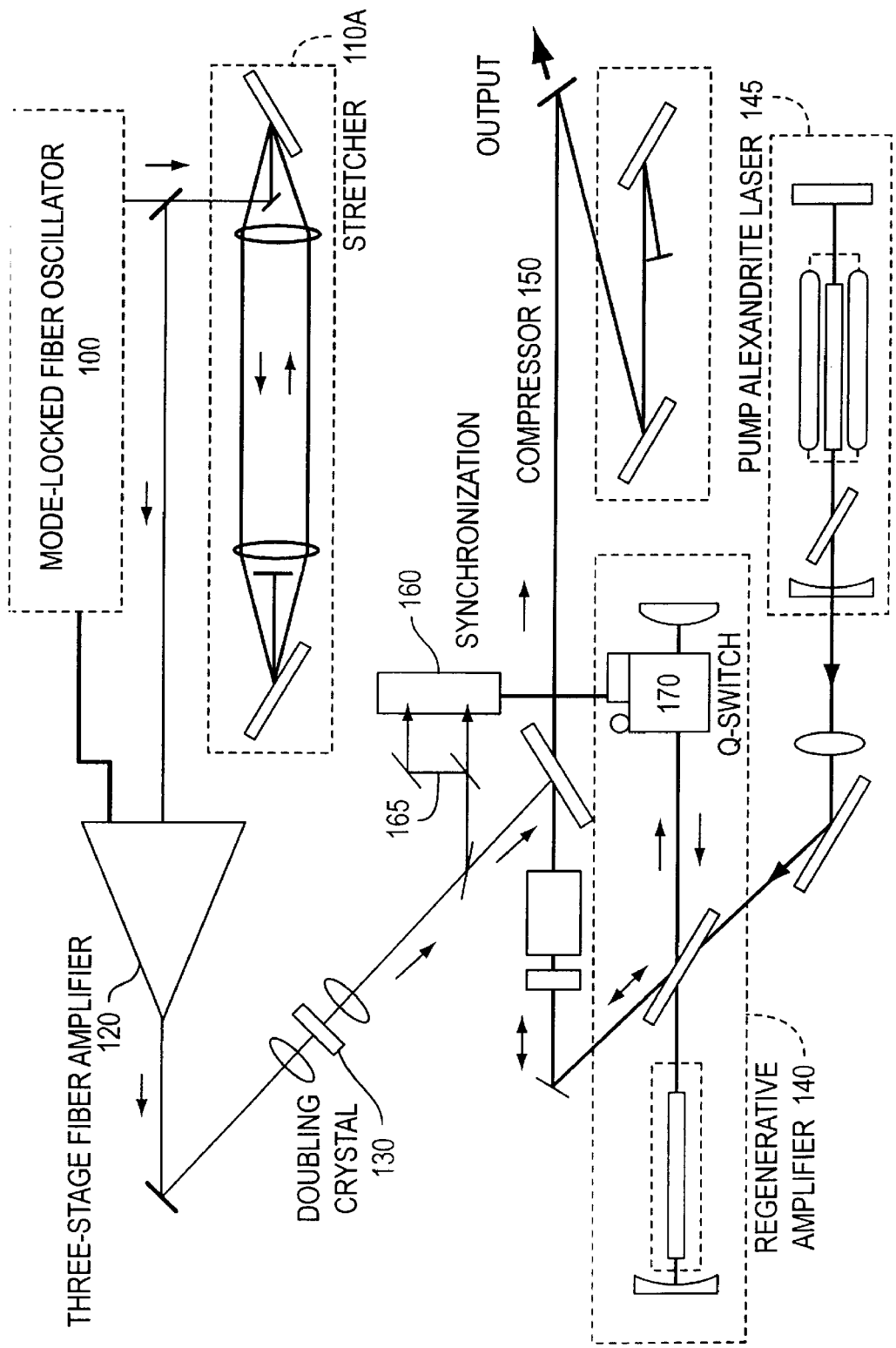
FIG. 10(b) depicts an exemplary use of the doubling crystals of the present invention in a non-hybrid CPA system.

One such modification is shown in FIG. 10(b), wherein the inventive fiber stretcher has been replaced with the traditional Martinez-Treacy stretcher-compressor arrangement. Specifically, the fiber stretcher 110 of FIG. 10(a) is replaced with a Martinez-type stretcher 110A and the compressor 150 has been modified to eliminate the telescope 155. Of course, the telescope 155 may still be inserted in the compressor 150 to obtain improved GVD compensation, as noted, for example, with respect to FIG. 6(g).

Figure 11A:
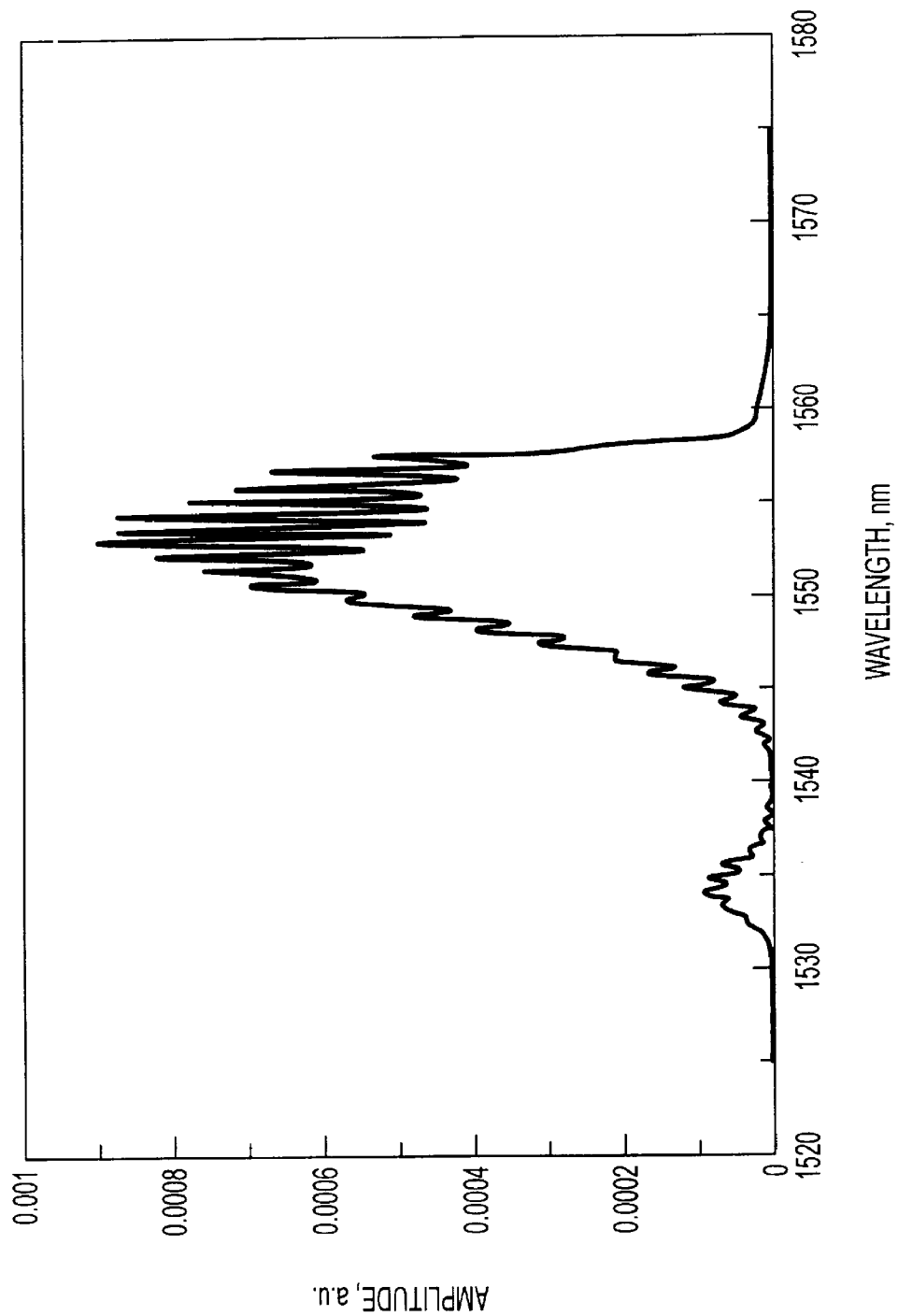
Figure 11B:
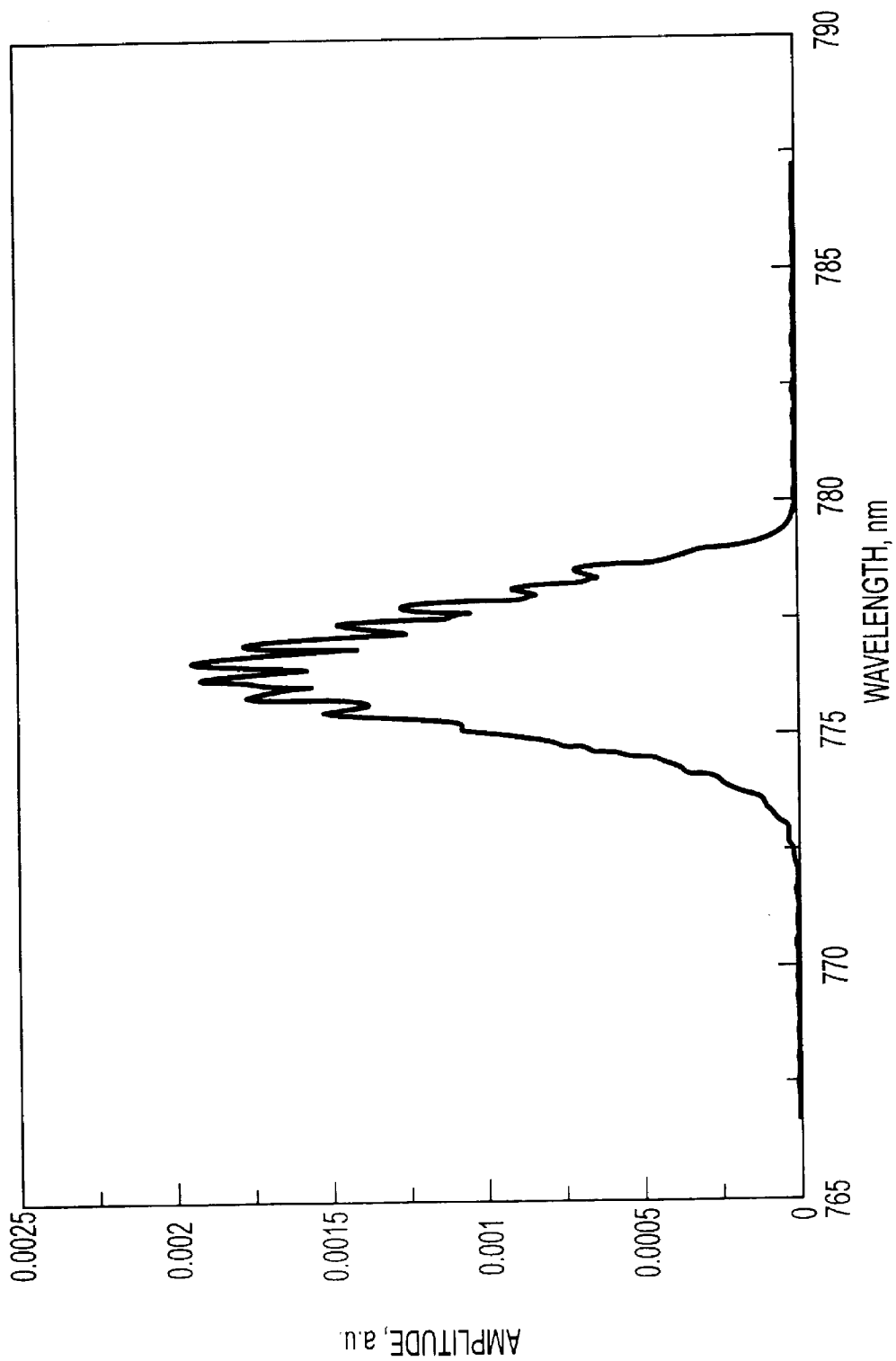
FIG. 11(b) depicts the second harmonic spectrum obtain with 300 picosecond pulses according to an embodiment of the present invention.

Using the doubling crystals to double the frequency of the stretched pulses according to the present invention is advantageous in may respects. Above 100 nJ of input pulse energy the second-harmonic generation is saturated with 10–12% conversion efficiency, indicating the substantial improvement compared to tens of microjoules required to reach the saturation with conventional birefringence phase-matched crystals. Frequency doubling of stretched—rather than compressed—pulses is also advantageous because it gives broader second harmonic spectrum, and consequently shorter recompressed pulses. This results from the fact that in frequency doubling of subpicosecond pulses temporal walk-off between fundamental and second harmonic pulses causes narrowing of the generated second-harmonic spectrum. Stretched pulses are typically much longer than this walk-off delay and are not affected by it. Thus the resulting second harmonic spectrum is broader. The second-harmonic spectrum of 300 ps pulses is shown in FIG. 11(b). It is twice broader (4 nm) than the second-harmonic spectrum (1.9 nm) obtain with the compressed femptosecond pulses.

DETAILED DESCRIPTION OF EXPERIMENTALLY DEMONSTRATED EMBODIMENTS

1. Compensation of dispersion mismatch between diffraction-grating stretcher and compressor The use of aberrations have been experimentally demonstrated with a CPA system similar to the one shown in FIG. 6(g). It was fiber-based microjoule amplification system. Initial pulses were generated with a modelocked fiber oscillator providing 175 fs initial pulses with spectral bandwidth of ~24 nm. These pulses were stretched in positive group velocity dispersion Martinez type diffraction-grating stretcher, amplified in a two-stage fiber amplifier up to the microjoule energy, and recompressed with a negative GVD Treacy type compressor. The distance between the compressor gratings was 50 cm. Martinez telescope in the stretcher comprised of two 50 cm focal length biconvex lenses. Total length of the stretcher was ~1.5 m.

Ideally, Martinez-configuration stretcher should match (be equal but of opposite sign) all dispersion orders of the Treacy compressor. In reality, however, aberrations of telescope lenses prevents from the complete matching. As it was noted above, this mismatch is particularly large at 1550 nm wavelength. Experimentally the present inventors found that due to large aberration contribution it was difficult to get recompressed pulses shorter than ~400 fs. Both numerically (using ray tracing) and experimentally (measuring pulse phase with so-called second-harmonic STRUT technique) (J-k Rhee, T. S. Sosnowski, T. B. Norris, J. A. Arns, W. S. Colburn, "Chirped-pulse amplification of 85-fs pulses at 250 kHz with third-order dispersion compensation by use of holographic transmission gratings," Opt. Lett. 19, 1550 (1994)), the present inventors determined that additional dispersion terms due to aberrations in a standard Martinez stretcher were: $\beta_3 \approx 100 \times 10^{-39}$ s$^3$ and $\beta_4 = -50 \times 10^{-51}$ s$^4$. Such large amounts of cubic and quartic phase distortion are impossible to compensate by intentional mismatch between the stretcher and the compressor.

Figure 9A:
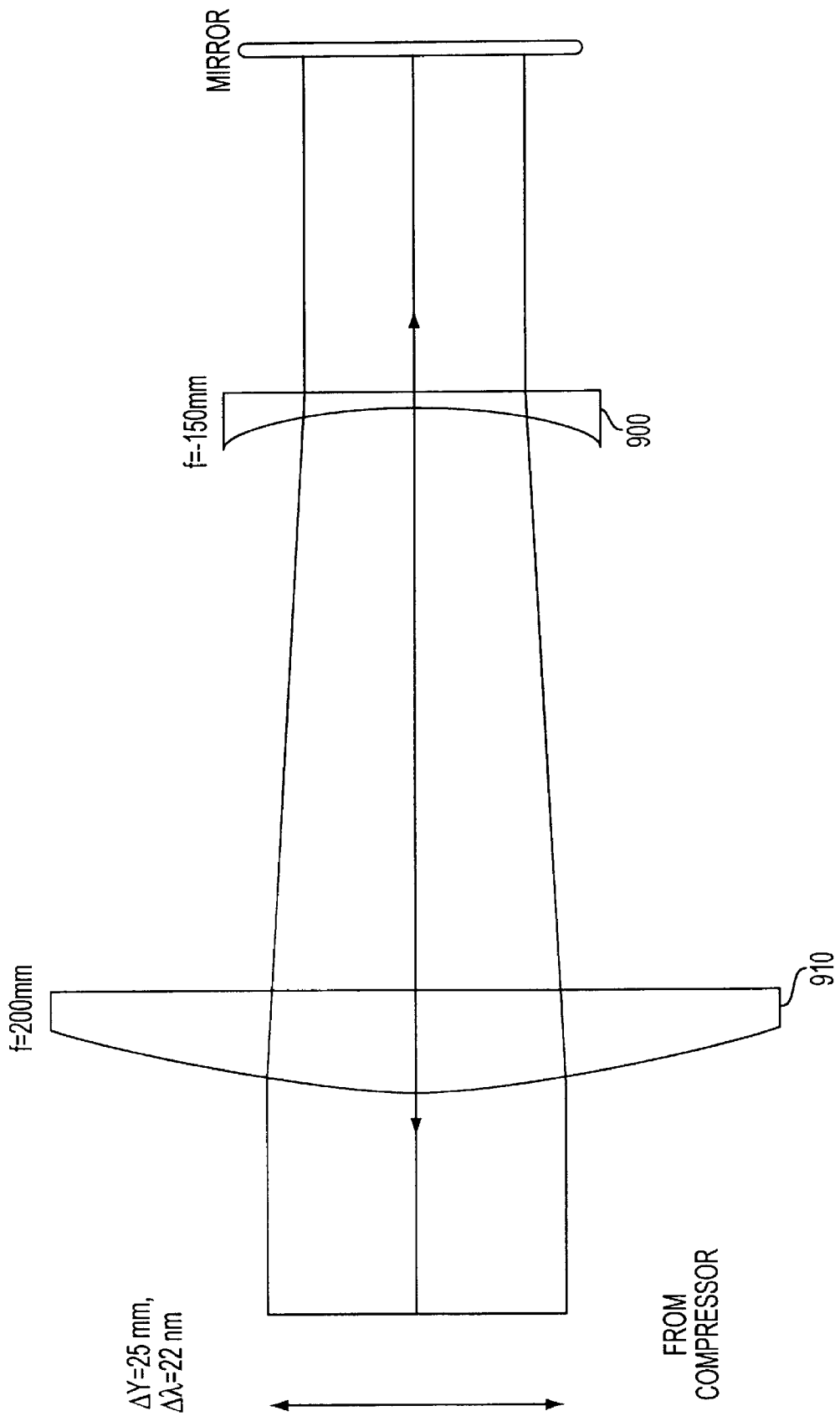
FIG. 9(a) depicts an exemplary lens arrangement used by the present inventors to demonstrate the advantageous features of an aspect of the present invention.

To compensate for these large cubic and quartic phase contributions a simple Galilean telescope was inserted into a spatially chirped beam after the second, recollimating grating of the stretcher. Detailed design of the telescope is shown in FIG. 9(a). It consisted of one singly concave lens 900 and one singly convex lens 910. Focal lengths as well as the incoming beam diameter and the FWHM bandwidth of the pulses are given in the figure. Orientation and order of placing the lenses are important for attaining the given amount of phase compensation. Using a numerical ray tracing the telescope lenses were chosen to provide dispersion terms $\beta_3^*$ and $\beta_4^*$ such that $\beta_3^*=-\beta_3$ and $\beta_4^*=-\beta_4$.

Figure 9B:
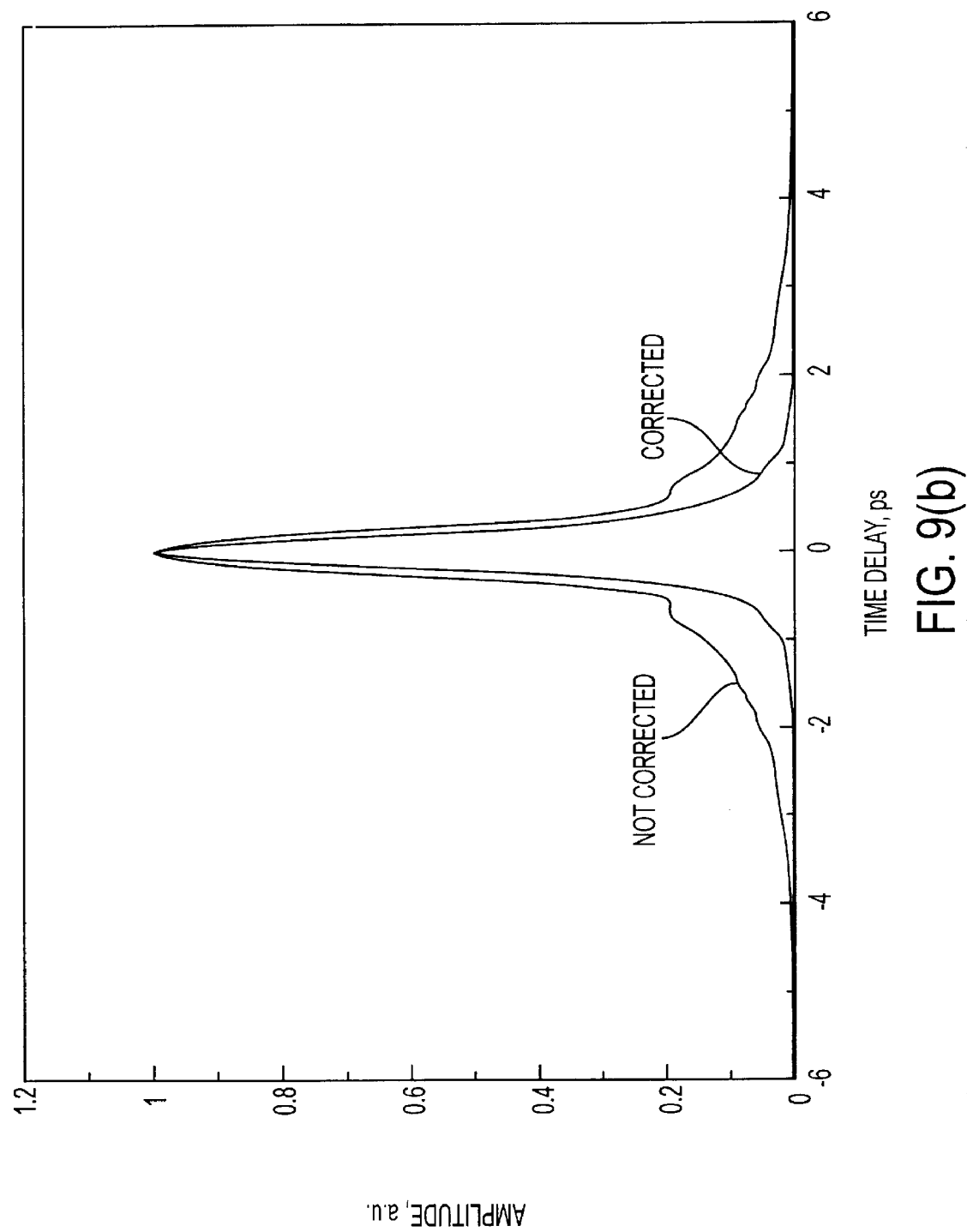
FIGS. 9(b) and 9(c) show time v. frequency plots correlating to the graphs shown in FIGS. 3(a) and 3(b).
Figure 9C:
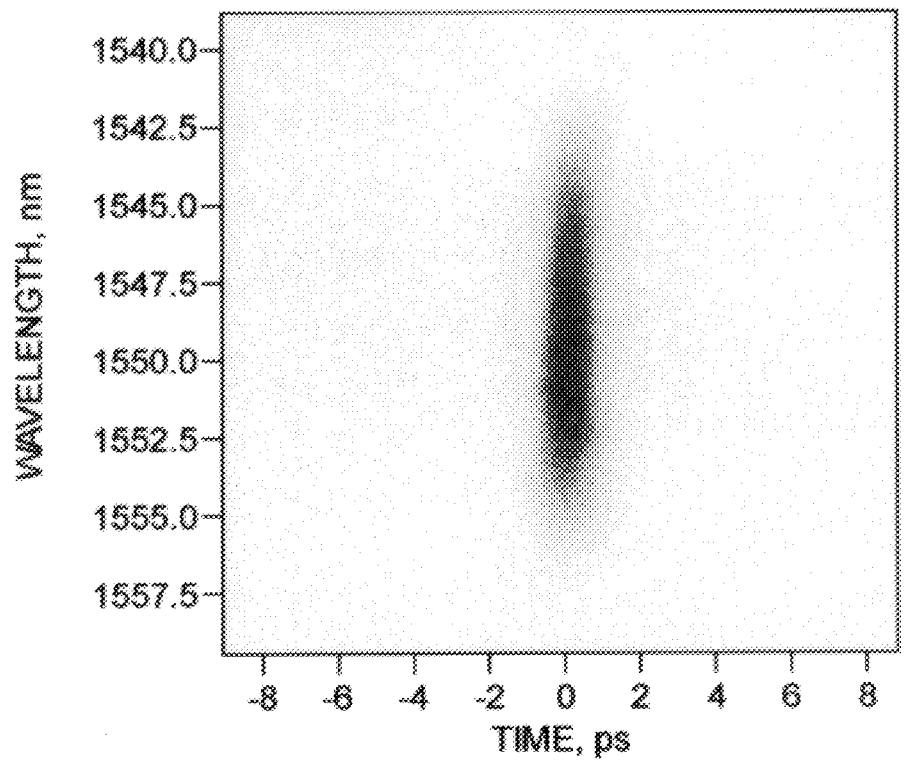
Figure 9D:
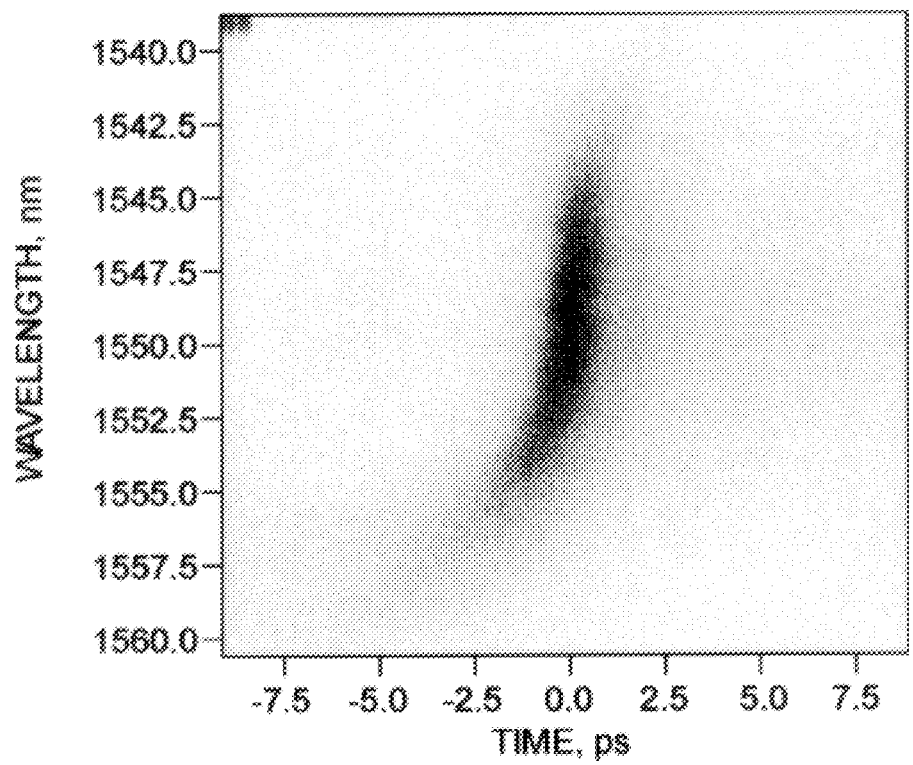

The use of the telescope according to the invention dramatically improved the quality and duration of the recompressed pulses. Autocorrelation traces of recompressed pulses after the standard and modified Martinez type stretcher are shown in FIG. 9(b). Pulse duration was reduced from 400 fs down to 240 fs. This was close to the estimated 204 fs transform-limited pulse duration. Second harmonic STRUT traces are shown in FIG. 9(c). (It is interesting to compare the plots of FIGS. 9(b) and 9(c) with the graphs of FIGS. 3(a) and 3(b).) The traces demonstrate that nonlinear phase is practically absent in the recompressed pulses after the additional aberration-compensation was used.

An important object is to achieve high quality beam after the arrangement with aberration telescope. For this particular system, ray tracing showed that wavefront distortion in the final beam from Martinez stretcher was smaller than $\lambda/4$, as is required by the tolerance conditions for primary aberrations (see ch. 9 in M. Born and E. Wolf, *Principles of Optics*, Pergamon Press, Oxford, 1975). Experimentally observed beam confirmed this expectation. The observed beam was circularly round without any observable spatial chirp.

The perfect elimination of quadratic, cubic and quartic phases was achieved by fine tuning of the amount of the corresponding dispersion order introduced by the compensating telescope of the present invention. Fourth-order phase have been controlled by moving the Martinez telescope along the beam between the gratings. This changed the size of the parallel collimated beam after the second grating while not affecting the dispersion of the standard stretcher configuration. Due to fourth-order dependence of this term on the beam size, this control provided sufficiently large adjustment range. Third order term was controlled by rotating the Galilean telescope with respect to the collimated beam. Second order term was matched by choosing the proper grating separations in a stretcher and compressor arrangements.

2. Hybrid chirped pulse amplification system consisting of fiber-based microjoule pulse seed source and Alexandrite-pumped-Alexandrite regenerative amplifier The experimental set-up of the hybrid fiber and Alexandrite CPA system is shown in FIG. 10. It consists of a cladding pumped mode-locked fiber oscillator 100, diffraction grating stretcher 110, three-stage fiber amplifier 120, nonlinear frequency doubling crystal 130, Alexandrite pumped Alexandrite regenerative amplifier 140, and diffraction-grating pulse compressor 150. The regenerative amplifier 140 is pumped by the pump Alexandrite laser 145.

The oscillator is pumped with a broad area 1 W diode laser (not shown). It provides 20 MHz 170 fs pulses. Use of broad-area laser diode considerably reduces the system costs. Diffraction gratings in the pulse stretcher 110 are arranged in a Martinez-type configuration. Gratings were holographically-made, have 1200 lines/mm and provide maximum diffraction efficiency at 1550 nm. Incidence angle for the input beam is set to 71°. Initial pulses are stretched to about 700 ps duration. Stretched pulses are injected into multistage fiber amplifier 120.

Each of the three amplifier stages are laser-diode pumped. Pumping powers and wavelengths are 50 mW at 1480 nm for the first stage, 200 mW at 980 nm for the second and 400 mW at 960 nm for the last stage. Three acousto-optic switches (not shown) were used at the input of each of the amplifiers to control pulse repetition rate and to block the spontaneous emission from saturating the subsequent stages. Acousto-optic gates are operated at the subharmonics of the fiber oscillator repetition rate. This allows to extract maximum pulse energies from each of the amplification stages. Pulse energy at the input of the first stage is 12 pJ, the second stage 5 nj, and the third stage ~1 µJ. For the third amplification stage broad mode-area fiber is used to reduce non-linear effects at microjoule pulse energies and to increase the compressible output energy. With this particular configuration energies of up to ~20 µJ were obtained.

The amplified pulse spectrum has approximately three times narrower bandwidth than the initial one from the mode-locked oscillator. This is the result of the gain narrowing effect at ~60 dB gain of the multistage fiber amplifier. Due to this effect, the duration of the stretched amplified pulses is also reduced down to 200–300 ps as estimated from the bandwidth of the final spectrum. The spectrum is shown in FIG. 11(a).

For efficient frequency doubling of long pulses quasi-phase matched $LiNbO_3$ crystals (PPLN) were used. The general advantage of a quasi-phase-matched nonlinear medium is the possibility to phase match at any wavelength within the transparency range of the crystal, at any operating temperature and using any components of the nonlinear susceptibility tensor (M. M. Fejer, G. A. Magel, D. H. Jundt, and R. L. Byer, "Quasi-Phase-Matched Second Harmonic Generation Tuning and Tolerances," IEEE J. Quant. Electron. QE-28, 2631 (1992)). This allows to increase frequency conversion efficiency dramatically by choosing the highest nonlinear coefficients and eliminating spatial walk-off between the fundamental and second-harmonic beams. In the case of LiNbO3 quasi-phasematching can be achieved using nonlinear coefficient $d_{33}$ (=27 pm/V), which is more than 10 times larger than the typical nonlinear coefficients available with the birefringence phase-matching (e.g., $d_{22}$ of BBO is 2.3 pm/V). Both fundamental and second-harmonic waves can be chosen to be of the same polarization (e.g., for using $d_{33}$ both waves have to be of extraordinary polarization) eliminating the beam walk-off and consequently maximizing the available interaction length. Quasi-phase-matching of lithium niobate crystals can be achieved by periodic reversal of the sign of the nonlinear susceptibility induced through electrical poling (L. E. Myers, R. C. Eckardt, M. M. Fejer, R. L. Byer, W. R. Bosenberg, J. W. Pierce, "Quasi-phase-matched optical parametric oscillators in bulk periodically poled $LiNbO_3$," J. Opt. Soc. Am. B. 12, 2102 (1995)). In the described experiments, periodically poled lithium niobate (PPLN) crystals were used with modulation period of ~19 µm for first-order quasiphase-matching at ~1550 nm. The exact phase-matching wavelength is selected by heating the crystal to the required temperature (tuning rate is ~0.183 nm/°C.). Typical operating temperatures were in the 20° –70° C. range. PPLN sample lengths of 400, 920 and 1250 µm have frequency-doubling bandwidths of 31.6, 13.8 and 10.12 nm respectively.

Above 100 nJ of input pulse energy the second-harmonic generation is saturated with 10–12% conversion efficiency, indicating the substantial improvement compare to tens of microjoules required to reach the saturation with conventional birefringence phase-matched crystals. The second-harmonic spectrum of 300 ps pulses is shown in FIG. 11(b). It is twice broader (4 nm) than the second-harmonic spectrum (1.9 nm) obtained with the compressed femtosecond pulses. This effect is caused by the temporal walkoff in the PPLN crystal. GVD is different at the fundamental and second-harmonic wavelengths giving the temporal delay between these two pulses of ~300 fs/mm. The effect of this delay is negligible for 300 ps stretched pulses but becomes important for femtosecond compressed pulses, increasing the duration and reducing spectral width of femtosecond SH pulses (W. H. Glenn, "Second-Harmonic Generation by Picosecond Optical Pulses," IEEE J. Quant. Electron. QE-5, 284 (1969)). Obviously, it is highly desirable to preserve the broadest spectrum as it leads to the shortest duration of the final amplified and recompressed pulses.

Figure 1B:
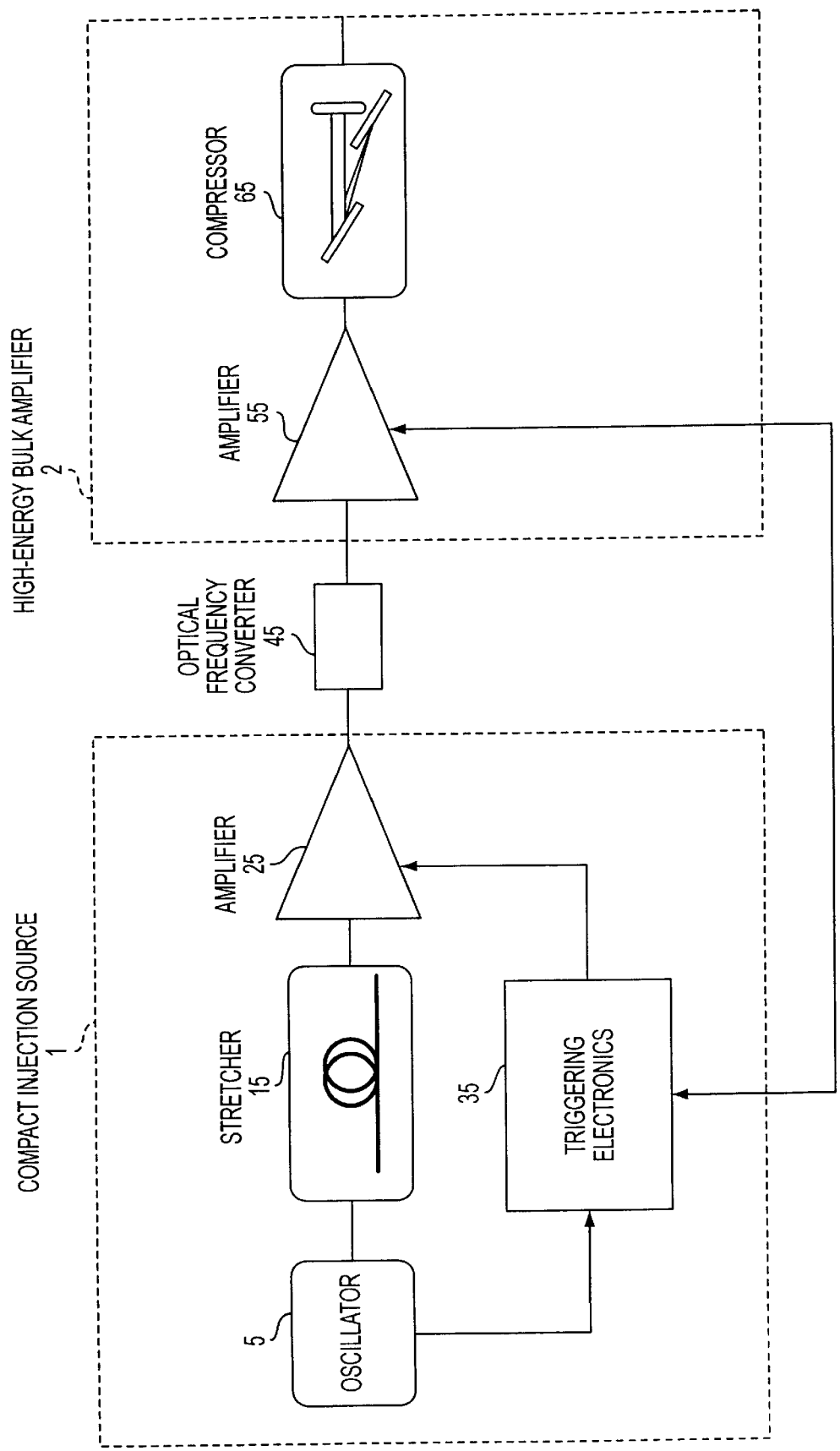

The advantages resulting from the use of the doubling crystals 130 according to the present invention are multitude. Of course the overall important feature is the capability of combining a compact injection source with high-energy bulk amplifier as noted with respect to FIG. 1(b). Other advantages can be made apparent when considering how such a system would be constructed without the use of the doubling crystals 130 according to the present invention. That is, without the frequency doubling crystals 130 according to the present invention one must use the triggering electronics, as shown in FIG. 1(b), to activate the regenerative amplifier 140. Using the doubling crystals 130, together with the arrangement shown in FIG. 8, the need for the triggering electronics is eliminated.

Similarly, without the doubling crystals 130 of the present invention, the beam from the three stage amplifier 120 would have had to be compressed in a compressor and frequency doubled before entering the regenerative amplifier. This, of course, would have introduce more bulk elements to the system. Again, the use of the doubling crystals 130 according to the present invention eliminates the need for such an arrangement.

Pulse energies obtained with a fiber amplifier are essentially at the upper limit for single-mode fibers. Although the saturation fluencies are rather high (2–3 $J/cm^2$), due to the small cross section of single-mode fiber core actual pulse energies are limited to 1–100 $\mu J$. For higher pulse energies bulk amplifiers have to be used. Possible choices are color center, Cr:YAG, erbium-doped glass, Alexandrite, Ti:sapphire, etc., gain media. Choices here also determined by the gain spectral position of a medium which either has to be at the fundamental or second harmonic of a fiber source.

In the particularly described experimental realization, the present inventors used Alexandrite regenerative amplifier for boosting pulse energies to a millijoule level. Alexandrite gain-bandwidth spans from 700 to 850 nm, which is suitable for amplification of second harmonic pulses from an erbium-doped fiber source.

In the present design of a regenerative amplifier another property of alexandrite has been exploited: the variation of its absorption properties with temperature (M. L. Shand, J. C. Walling, and H. Jenssen, "Ground State Absorption in the Lasing Wavelength Region of Alexandrite: Theory and Experiment", IEEE J. Quant. Electron. QE-18, 167 (1982)). The Alexandrite amplifier 140 was pumped with another Alexandrite pump laser 145, with the two gain media operating at different temperatures. Pump laser 145 was kept at about room temperature (50° C.) and amplifier 140 was maintained at elevated temperatures to absorb pump light at 735 nm. Laser pumping of Alexandrite with Alexandrite gives the advantage of increasing the brightness of the pump for a regenerative amplifier.

Regenerative amplifier can not be pumped transversely because the brightness of the multimode broad area laser diodes is not sufficient for achieving sufficiently good mode-matching. For optimal results the amplifier should be longitudinally pumped by TMOO mode. Longitudinal pumping with a diode requires single-mode laser diodes, which are not high powered. On the other hand, multimode diodes can only be used with complicated beam shaping optics. The advantageous solution provided by the present invention is to pump the pump Alexandrite laser 145 transversely with diodes (not shown) and to use the output of the pump Alexandrite laser 145 as a pump beam for the regenerative amplifier 140. Even when the output of this diode pumped Alexandrite is multi-transverse mode, its brightness of $1.5 \times 10^8$ $W/cm^2$-sr is several orders of magnitude higher than the brightness obtainable with multimode laser diodes. This increases overall efficiency and helps to maintain a single, diffraction-limited, transverse mode output from the regenerative amplifier 140. Additional advantage of longitudinal pumping is that it reduces the thermal lensing effects in the laser rod.

Frequency doubled pulses were injected into Alexandrite regenerative amplifier 140, where after ~60 passes pulse energy reached 10 mJ. In this particular experimental set up, the pump Alexandrite laser 145 was flashlamppumped with 100 J per pulse. However, this geometry permits efficient laserdiode pumping. The pump laser 145 generated up to 1 J per pulse in 150 $\mu s$ pulse duration and at 10 Hz repetition rate. Output wavelength was tunable between 720 to 760 nm with maximum energy at 735 nm. The pump laser 145 had multimode spatial output with beam size 7 to 10 mm. To absorb the pump light the Alexandrite amplifier 140 was maintained at 250°–350° C. Thus, with the advantageous set-up of the present invention it is possible to use a pump Alexandrite laser to pump an Alexandrite regenerative amplifier.

An interesting feature of the experimental set-up was that initial femtosecond pulses were stretched at 1550 nm and compressed pulses were obtained at 775 nm. For matching the stretcher 110 and the compressor 150, the compressor was provided with gratings having 2400 lines/mm. This allowed to have $\lambda/d$ (d-grating period) identical to the one of 1200 lines/mm stretcher gratings at 1550 nm and resulted in identical dispersions characteristics of these gratings.

Finally, it is useful to note that the method used to increase the pump brightness for the regenerative amplifier 140 (Alexandrite pumped Alexandrite) can be also extended for the pumping of a fiber amplifier. For fiber amplifier the traditional way to solve the problem of pump brightness conversion is the double clad geometry. Multimode pump from a broad area laser diode or diode array is propagated in a pump cladding, while the signal is propagated in a single-mode core surrounded by this cladding (H. Po, J. D. Cao, B. M. Laliberte, R. A. Minns, R. F. Robinson, B. H. Rockney, R. R. Tricca and Y. H. Zhang, "High Power Neodymium-Doped Single Transverse Mode Fibre Laser," Electron. Lett. 29, 1500 (1993)). The pumped energy is absorbed by the active gain medium of the core. However, this absorption is much less efficient than for the pump propagating directly in the single-mode core and requires considerable co-propagation lengths to achieve practical efficiencies of such amplifiers. To generate microjoule pulses, a fiber amplifier would have to be as short as possible to reduce nonlinear effects at the maximum peak powers. This makes cladding pumping geometry inefficient for this type of high energy amplifier.

One solution provided by the present invention would be to pump a single mode high-energy amplifier with another cladding pumped fiber laser. This is possible due to the gain properties of an erbium doped fiber. For standard erbium doped fiber, gain spectrum spans from 1530 nm to ~1570 nm. By changing doping content and concentrations absorption cross section at 1530 nm can be made larger than emission cross section and such fiber can be pumped with another Er doped fiber laser operating at 1530 (H. Nakamura, A. Fujisaka, H. Ogoshi, "Gain and noise characteristics of erbium-doped fiber amplifier pumped at 1530 nm," Optical Fiber Communication, Technical to Digest, Paper WK9, February–March 1996, San Jose, Calif.).

According to an aspect of the present invention, cladding-pumped Er laser is used as a pump source for high energy fiber amplifier. Such pump laser can be either cw or pulsed (e.g., Q-switched). This would dramatically reduce the cost of pump sources for microjoule fiber CPA system, since it would allow to replace expensive MOPA single-mode diodes with inexpensive and reliable broad area laser diodes or arrays.

Although the invention has been described and shown in terms of a preferred embodiment thereof and experimental set ups, it will be understood by those skilled in the art that changes in form and detail may be made therein without departing from the spirit and scope of the invention as defined in the appended claims.

What is claimed is:

1. A system for amplification of short optical pulses, comprising:
    a compact stretcher receiving light pulses and outputting stretched light pulses therefrom;
    an optical amplifier receiving the stretched light pulses and outputting amplified light pulses therefrom;
    a compressor receiving the amplified light pulses and outputting compressed light pulses therefrom, said compressor having at least one light path wherein the amplified pulse is collimated, and comprising a lens arrangement inserted in said light path, said lens arrangement preserving collimation of said amplified pulse.

2. The system for amplification of short optical pulses as claimed in claim 1, wherein said compressor comprises a collimating diffraction grating and a reflector, and wherein the lens arrangement is situated in a light path between the diffraction grating and the reflector.

3. The system for amplification of short optical pulses as claimed in claim 2, wherein said diffraction grating is transmissive.

4. The system for amplification of short optical pulses as claimed in claim 2, wherein said diffraction grating is reflective.

5. The system for amplification of short optical pulses as claimed in claim 1, wherein said stretcher comprises fiber grating.

6. The system for amplification of short optical pulses as claimed in claim 1, wherein said stretcher comprises dispersion fiber.

7. The system for amplification of short optical pulses as claimed in claim 6, wherein said dispersion fiber further comprises a reflecting element at an end thereof.

8. The system for amplification of short optical pulses as claimed in claim 7, wherein said reflecting element is a faraday rotating mirror.

9. A system for amplification of short optical pulses, comprising:
    a selfphase modulation fiber
    an optical amplifier receiving stretched light pulses and outputting amplified light pulses therefrom;
    a compressor receiving the amplified light pulses and outputting compressed light pulses therefrom, said compressor having at least one light path wherein the amplified pulse is collimated, and comprising a lens arrangement inserted in said light path, said lens arrangement preserving collimation of said amplified pulse.

10. A system for producing short optical pulses, comprising:
    a compact injection source producing light pulses;
    an optical amplifier receiving the light pulse and outputting amplified pulses therefrom;
    a compressor receiving the amplified pulses and outputting compressed pulses, said compressor having at least one collimated light path, and comprising a lens arrangement inserted in said collimated light path, wherein said lens arrangement preserves collimation.

11. The system for producing short optical pulses as recited in claim 10, wherein said compact injection source comprises a tunable laser diode.

12. The system for producing short optical pulses as recited in claim 10, wherein said compact injection source comprises an oscillator producing short light pulses and a compact stretcher for stretching the short light pulses.

13. The system for producing short optical pulses as recited in claim 10, wherein said compact injection source comprises a compact stretcher for stretching received light pulses, and wherein said system further comprises a compact compressor inserted between said optical amplifier and said compressor for pre-compressing light pulses received from said optical amplifier and sending the pre-compressed light pulses to said compressor.

14. A system for amplification of short optical pulses, comprising:
    a stretcher receiving light pulses and outputting stretched light pulses therefrom, said stretcher having at least one collimated light path, and wherein said stretcher comprises a lens arrangement inserted in said collimated light path;
    an optical amplifier receiving the stretched light pulses and outputting amplified light pulses therefrom;
    a compressor receiving the amplified light pulses and outputting compressed light pulses therefrom;
    wherein said lens arrangement preserves collimation of light passing therethrough.

15. The system for amplification of short optical pulses as claimed in claim 14, wherein said stretcher comprises a collimating diffraction grating and a reflector, and wherein the lens arrangement is situated in a light path between the diffraction grating and the reflector.

16. The system for amplification of short optical pulses as claimed in claim 15, wherein said diffraction grating is transmissive.

17. The system for amplification of short optical pulses as claimed in claim 15, wherein said diffraction grating is reflective.

18. A system for amplification of short optical pulses, comprising:
    a stretcher receiving light pulses and outputting stretched light pulses therefrom;
    a nonlinear group velocity dispersion compensator, said compensator having at least one collimated light path, and comprising a lens arrangement inserted in said collimated light path;

an optical amplifier receiving the light pulses from said compensator and outputting compensated amplified light pulses;

a compressor receiving the compensated amplified light pulses and outputting compressed light pulses therefrom wherein said lens arrangement preserves collimation of said light pulses passing therethrough.

19. The system for amplification of short optical pulses as claimed in claim 18, wherein said compensator comprises one of a transmissive diffraction element and a transmissive dispersion element, and wherein the telescope is situated in a light path between the diffraction element and the reflector.

20. A system for amplification of short optical pulses, comprising:

a stretcher receiving light pulses and outputting stretched light pulses therefrom, said stretcher comprising a nonlinearly chirped fiber grating;

an optical amplifier receiving the stretched light pulses and outputting amplified light pulses therefrom;

a compressor receiving the amplified light pulses and outputting compressed light pulses therefrom.

21. A method for compensating nonlinear group velocity dispersion mismatch between a stretcher and a compressor in a system for amplification of short optical pulses, said method comprising inserting at least one lens arrangement in a spatially chirped collimated beam in one of said stretcher and compressor, wherein the lens arrangement preserves collimation of light passing therethrough.

22. A method for compensating nonlinear group velocity dispersion mismatch between a stretcher and a compressor in a system for amplification of short optical pulses, said method comprising creating a nonlinearly chirped Bragg grating in said stretcher.

23. An apparatus for amplifying stretched ultrashort pulses, comprising:

a first gain media having a predefined amplification band;

a second gain media having a predefined amplification band which does not overlap the amplification band of said first gain media;

a nonlinear optical crystal inserted in a light path between said first and second gain media for achieving wavelength matching between said first and second gain media.

24. In an apparatus for amplifying stretched ultrashort pulses, said apparatus comprising a first gain media having a predefined amplification band and a second gain media having a predefined amplification band which does not overlap the amplification band of said first gain media, a method for achieving wavelength matching between said first and second gain media, said method comprising inserting a nonlinear optical crystal in a light path between said first and second gain.

25. An optical amplification system, comprising:

a laser amplifier operating at a first set of predetermined conditions:

a pump laser consisting essentially of the same material as the amplifier and operating under a second set of predetermined operating conditions different from said first set of operating conditions to thereby emit light at a shorter wavelength than said amplifier and match an absorption band of said amplifier.

26. A method for operating an optical amplification system, said optical amplification system comprising a laser amplifier and a pump laser consisting essentially of the same material as the amplifier, the method comprising:

operating said laser amplifier at a first set of predetermined conditions;

operating said pump laser under a second set of predetermined operating conditions different from said first set of operating conditions to thereby cause said pump laser to emit light at a shorter wavelength than said amplifier and to match an absorption band of said amplifier.

27. The optical amplification system of claim 25, wherein the laser amplifier is an alexandrite regenerative amplifier operating at a first temperature, and said pump laser is a pump alexandrite laser operating at a second temperature elevated from said first temperature.

28. The method of operating an optical amplification system according to claim 26, wherein the gain medium is an alexandrite regenerative amplifier, and said pump laser is a pump alexandrite laser, and wherein said first set of operating condition comprises operating said amplifier laser at a temperature elevated from room temperature and wherein said second set of operating condition comprises operating said pump laser at room temperature.

29. The optical amplification system of claim 25, wherein the laser amplifier is an erbium doped fiber amplifier and said pump laser is an erbium doped fiber pump laser, and wherein said fiber amplifier have an absorption cross section at a lasing wavelength of the pump laser, and wherein said fiber amplifier produces an emission cross section which is lower than said absorption cross section.

30. The method for operating an optical amplification system as claimed in claim 26, wherein the gain medium is an erbium doped fiber amplifier, and said pump is a pumped fiber, and wherein said first set of operating conditions and said second set of operating conditions are predefined to cause said fiber amplifier to have an absorption cross section at a lasing wavelength of the pump laser, and a to further cause said fiber amplifier to produce an emission cross section which is lower than said absorption cross section.

31. The method for operating an optical amplification system as claimed in claim 30, wherein said first set of operating conditions comprises doping said fiber amplifier to a first level of doping and wherein said second set of operating conditions comprises doping said pumped fiber to a second level of doping different from said first level.

32. The method for operating an optical amplification system as claimed in claim 30, wherein said first set of operating conditions comprises doping said fiber amplifier using a predefined doping content and wherein said second set of operating conditions comprises doping said pumped fiber using a second predefined doping content different from said first predefined doping content.

33. The optical amplification system of claim 29, wherein said pump fiber is Q-switched laser pump.

34. The method for operating an optical amplification system as claimed in claim 30, wherein said pump fiber is Q-switched pump laser.

35. An optical amplification system, comprising:

a switched regenerative amplifier receiving light pulses and amplifying said light pulses;

a doubling crystal for doubling the frequency of said light pulses before said light pulses enter said regenerative amplifier;

means for splitting said light signals after said light signals pass through said doubling crystal but before said light pulses enter said regenerative amplifier, to thereby produce a main beam and a secondary beam of said light pulse;

means for diverting said secondary beam for operating a switch of said switched regenerative amplifier.

36. An optical amplification system, comprising:

an oscillator for producing light pulses having a defined frequency;

a stretcher for stretching said light pulses;

a compact amplifier for amplifying said light pulses received from said stretcher;

a doubling crystal receiving said light pulses from said compact amplifier and doubling the frequency of said light pulses;

a bulk amplifier receiving said light pulses from said doubling crystal and amplifying said light pulses;

a compressor receiving said light pulses from said bulk amplifier and compressing said light pulses.

37. The optical amplification system of claim 36, wherein said bulk amplifier comprises:

a regenerative Alexandrite laser amplifier;

pump Alexandrite laser;

wherein the output of said pump Alexandrite laser is fed into said regenerative Alexandrite laser amplifier.

38. The optical amplification system of claim 37, wherein said regenerative Alexandrite laser amplifier includes an electro-optical switch, and wherein said system further comprises:

a beam spliter for splitting said light pulses and defining plurality of light paths, wherein light pulses from one of said light paths enters said regenerative Alexandrite laser amplifier and light pulses of another one of said light paths are used to switch said electro-optical switch.

39. The system for amplification of short optical pulses as claimed in claim 18, further comprising a second optical amplifier for amplifying the stretched light pulses received from said stretcher.

40. A system for amplification of short optical pulses, comprising:

a stretcher receiving light pulses and outputting stretched light pulses therefrom;

an optical amplifier receiving the stretched light pulses and outputting amplified light pulses therefrom;

a compressor receiving the amplified light pulses and outputting compressed light pulses therefrom, said compressor comprising a nonlinearly chirped fiber grating.

41. A system for amplification of short optical pulses, comprising:

a stretcher receiving light pulses and outputting stretched light pulses therefrom;

an optical amplifier receiving the stretched light pulses and outputting amplified light pulses therefrom;

a compressor receiving the amplified light pulses and outputting compressed light pulses therefrom;

a group velocity dispersion compensator comprising a nonlinearly chirped fiber grating.

42. An optical amplification system, comprising:

an oscillator for producing light pulses having a defined frequency;

a stretcher for stretching said light pulses;

a compact amplifier for amplifying said light pulses received from said stretcher;

a beam splitter for splitting said light pulses;

a bulk amplifier comprising an electro-optical switch responsive to light pulses from said beam spliter.

43. A system for producing short optical pulses, comprising:

a compact injection source producing light pulses;

an optical amplifier for amplifying said optical pulses;

a nonlinear group velocity dispersion compensator, said compensator having at least one collimated light path, and comprising a lens arrangement inserted in said collimated light path;

a compressor receiving the compensated amplified light pulses and outputting compressed light pulses therefrom.

* * * * *